United States Patent
Katakura

(10) Patent No.: US 7,593,167 B2
(45) Date of Patent: Sep. 22, 2009

(54) THREE-UNIT ZOOM LENS SYSTEM AND IMAGE PICKUP APPARATUS HAVING THREE-UNIT ZOOM LENS SYSTEM

(75) Inventor: Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/154,546

(22) Filed: May 22, 2008

(65) Prior Publication Data
US 2008/0304163 A1    Dec. 11, 2008

(30) Foreign Application Priority Data
May 28, 2007    (JP) .............................. 2007-140280

(51) Int. Cl.
    *G02B 15/14* (2006.01)
(52) U.S. Cl. ....................... 359/682; 359/680
(58) Field of Classification Search ................ 359/680, 359/682, 689
    See application file for complete search history.

(56) References Cited

U.S. PATENT DOCUMENTS

2006/0056045 A1    3/2006    Yoshitsugu

| | | | |
|---|---|---|---|
| 2009/0015941 A1* | 1/2009 | Katakura | 359/689 |
| 2009/0034093 A1* | 2/2009 | Katakura | 359/689 |
| 2009/0091845 A1* | 4/2009 | Katakura | 359/691 |
| 2009/0097132 A1* | 4/2009 | Katakura | 359/684 |

FOREIGN PATENT DOCUMENTS

JP    2006-039523    2/2006

* cited by examiner

*Primary Examiner*—David N Spector
(74) *Attorney, Agent, or Firm*—Kenyon & Kenyon LLP

(57) ABSTRACT

A three-unit zoom lens system includes in order from an object side thereof, a first lens unit having a negative refracting power, a second lens unit having a positive refracting power, and a third lens unit having a refracting power. The first lens unit includes a biconcave negative lens component nearest to the object side, and the biconcave negative lens component is the only negative lens component in the first lens unit. The second lens unit includes a cemented lens component which includes in order from the object side thereof, at least three lenses cemented mutually on an optical axis, namely a first positive lens, a negative lens, and a second positive lens. A surface on the image side of the negative lens is a concave surface, and the negative lens has an Abbe's number smaller than the Abbe's number for the first positive lens and the second positive lens, and has a refractive index higher than a refractive index of the second positive lens. The third lens unit includes one lens component, and satisfies predetermined conditional expressions.

16 Claims, 13 Drawing Sheets

THREE-UNIT ZOOM LENS SYSTEM AND IMAGE PICKUP APPARATUS HAVING THREE-UNIT ZOOM LENS SYSTEM

CROSS-REFERENCE TO RELATED APPLICATION

The present application is based upon and claims the benefit of priority from the prior Japanese Patent Application No. 2007-140280 filed on May 28, 2007; the entire content of which are incorporated herein by reference.

BACKGROUND OF THE INVENTION

1. Field of the Invention

The present invention relates to a small size zoom lens system, and an image pickup apparatus such as a compact digital camera in which the small size zoom lens system is used.

2. Description of the Related Art

In an image pickup apparatus such as a digital camera and a video camera, a high image quality and a high zooming ratio have hitherto been sought. For example, in Japanese Patent Application Laid-open Publication No. 2006-39523, a three-unit zoom lens system which includes in order from an object side thereof, a first lens unit having a positive refracting power, a second lens unit having a negative refracting power, and a third lens unit having a positive refracting power has been disclosed. This three-unit zoom lens system achieves a zooming ratio of about 2.9. Moreover, the second lens unit is a cemented lens formed by a positive lens, a negative lens, and a positive lens in order from the object side, and secures optical performance and reduces an effect due to decentering.

SUMMARY OF THE INVENTION

According to one aspect of the present invention, a three-unit zoom lens system includes in order from an object side thereof, a first lens unit having a negative refracting power,
a second lens unit having a positive refracting power, and
a third lens unit having a refracting power.

At the time of zooming from a wide angle end to a telephoto end, a distance between the first lens unit and the second lens unit is narrowed, and a distance between the second lens unit and the third lens unit changes.

The second lens unit moves toward the object side at the time of zooming from the wide angle end to the telephoto end, the third lens unit moves to a position of increasing magnification at the telephoto end with respect to a position at the wide angle end.

The first lens unit includes a biconcave negative lens component nearest to the object, and the biconcave negative lens component is the only negative lens component in the first lens unit.

The second lens unit includes a cemented lens component which includes three lenses in order from the object side namely, a first positive lens, a negative lens, and a second positive lens, and these three lenses are cemented mutually on an optical axis.

The total number of lens components in the second lens unit is one, and a surface on the image side of the negative lens in the second lens unit is a concave surface, and the negative lens in the second lens unit has an Abbe's number smaller than the Abbe's number of the first positive lens and the second positive lens, and has a refractive index higher than a refractive index of the second positive lens.

The third lens unit includes a lens component, and
the total number of lens components in the third lens unit is one, and the three-unit zoom lens system satisfies the following conditional expressions $$f_t/f_w > 3.6 \tag{1}$$

$$0 < (r_{L11f} + r_{L11r})/(r_{L11f} - r_{L11r}) < 1.0 \tag{2}$$

where, $f_w$ denotes a focal length of the three-unit zoom lens system, at the wide angle end, $f_t$ denotes a focal length of the three-unit zoom lens system at the telephoto end, $r_{L11f}$ denotes a paraxial radius of curvature of a surface on the object side, of the biconcave negative lens element in the first lens unit, and $r_{L11r}$ denotes a paraxial radius of curvature of a surface on the image side, of the biconcave negative lens element in the first lens unit, and the lens component is a lens having only two surfaces which make a contact with air on the optical axis, namely a surface on the object side and a surface on the image side, and means a single lens or a cemented lens.

According to another aspect of the present invention, an image pickup apparatus includes a three-unit zoom lens system, and
an image pickup element which is disposed at an image side of the three-unit zoom lens system, and which changes an optical image formed the three-unit zoom lens system, to an electric signal, and the three-unit zoom lens system is a zoom lens system according to one aspect of the present invention.

BRIEF DESCRIPTION OF THE DRAWINGS

FIG. 1A shows a state at a wide angle end, FIG. 1B shows an intermediate state, and FIG. 1C shows a state at a telephoto end;

FIG. 3A shows a state at the wide angle end, FIG. 3B shows an intermediate state, and FIG. 3C shows a state at a telephoto end.

DETAILED DESCRIPTION OF THE INVENTION

Figure 1A:
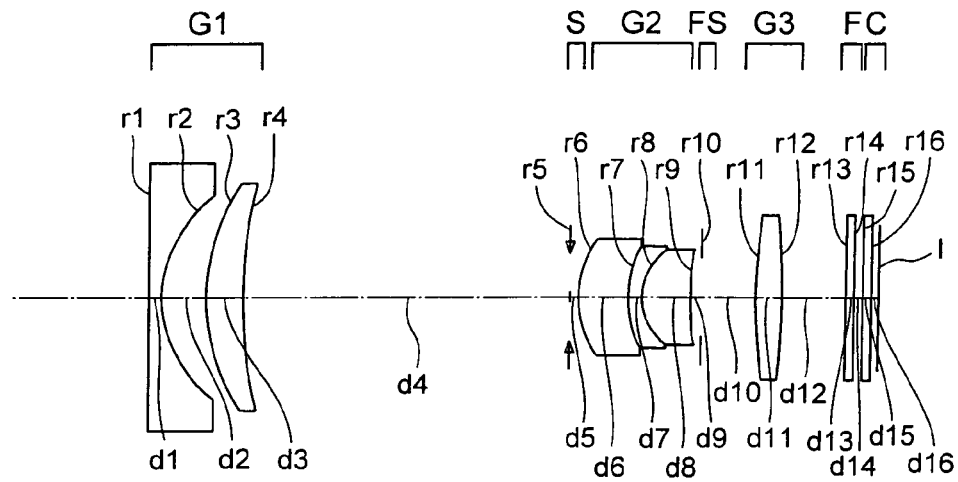
FIG. 1A, FIG. 1B, and FIG. 1C are lens cross-sectional views along an optical axis showing an optical arrangement at the time of infinite object point focusing of a first embodiment of a zoom lens system according to the present invention, where.

In the present invention, a three-unit zoom lens system has a basic structure which includes in order from an object side thereof, a first lens unit having a negative refracting power, a second lens unit having a positive refracting power, and a third lens unit having a refracting power, and at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, the third lens unit moves to a position of increasing magnification at the telephoto end with respect to a position at the wide angle end.

In this manner, by letting the refracting power of the first lens unit to be negative, it is advantageous for securing an image angle, making a size small in a radial direction, and reducing the number of lens units forming the system. Moreover, by the second lens unit having a positive refracting power changing the distance with the first lens unit, the second lens unit functions as a variator, and a zooming is increased by moving from the object side to the image side at the time of zooming from the wide angle end to the telephoto end. Further, the third lens unit is imparted either a positive refracting power or a negative refracting power, and the magnification is increased at the telephoto end with respect to the wide angle end.

By increasing the magnification at the time of zooming from the wide angle end to the telephoto end, in the two lens units namely the first lens unit and the second lens unit, it is possible to distribute an effect of increase in magnification by each lens unit by a small amount of movement, and it is possible to make small an overall length of the zoom lens system, with an image quality maintained to be favorable.

On the other hand, when an attempt is made to achieve a high zooming ratio which satisfies the following conditional expression (1), an effect of an aberration near the telephoto end has to be taken into consideration. Moreover, due to a reduction in size, it is preferable to take into consideration also an arrangement in each lens unit.

$$f_t/f_w > 3.6 \quad (1)$$

where, $f_w$ denotes a focal length of the three-unit zoom lens system, at the wide angle end, and $f_t$ denotes a focal length of the three-unit zoom lens system at the telephoto end.

It is preferable that the first lens unit includes a biconcave negative lens component nearest to the object side, and that the biconcave negative lens component is the only negative lens component in the first lens unit. Here, the lens component is a lens having only two surfaces which make a contact with air on the optical axis, namely a surface on the object side and a surface on the image side, and means a single lens or a cemented lens.

By making such an arrangement, the number of negative lens components in the first lens unit is let to be one, and disposing the negative lens component nearest to the object is advantageous for making small a size of the first lens unit. Moreover, it is preferable to divide the negative refracting power in a plurality of lens surfaces while securing the negative power by letting the negative lens component to have a biconcave shape, and to let a shape which is advantageous for reduction of a spherical aberration and a coma aberration near the telephoto end. Concretely, it is preferable to let the shape which satisfies the following conditional expression (2).

$$0 < (r_{L11f} + r_{L11r})/(r_{L11f} - r_{L11r}) < 1.0 \quad (2)$$

where, $r_{L11f}$ denotes a paraxial radius of curvature of a surface on the object side, of the biconcave negative lens element in the first lens unit, and $r_{L11r}$ denotes a paraxial radius of curvature of a surface on the image side, of the biconcave negative lens element in the first lens unit.

By making an arrangement such that a value is not lower than a lower limit value in conditional expression (2), it becomes easy to weaken a curvature of a concave surface on the object side, and it becomes easy to suppress an occurrence of the excessive distortion and coma aberration. By making an arrangement such that a value is not higher than an upper limit value in conditional expression (2), it becomes easy to weaken a curvature of a surface on the image side, and to suppress an occurrence of an aberration such as the spherical aberration near the telephoto end.

It is preferable that the second lens unit, includes a cemented lens component in which, at least three lenses namely, a first positive lens, a negative lens, and a second positive lens are cemented in order from the object side, on the optical axis, and a surface on the image side of the negative lens in the second lens unit has an Abbe's number smaller than the Abbe's number for the first positive lens and the second positive lens, and has a refractive index higher than a refractive index of the second positive lens.

It becomes easy to carry out a correction of various aberrations such as a chromatic aberration and the spherical aberration, even when the refracting power of the second lens unit is secured. Moreover, since the surface on the image side of the negative lens becomes a cemented surface having a negative refracting power, it becomes easy to bring principal points of the second lens unit toward the object side, and it becomes easy to secure a zooming ratio.

It is preferable that the third lens unit includes one lens component, from a point of making the size small.

Furthermore, it is preferable that the second lens unit satisfies the following conditional expression (3).

$$2.1 < D_{L23}/D_{L22} < 7.0 \quad (3)$$

where, $D_{L23}$ denotes an optical axial thickness of the second positive lens in the second lens unit, and $D_{L22}$ denotes an optical axial thickness of the negative lens in the second lens unit.

Conditional expression (3) is an expression showing a relationship of a preferable thickness on the optical axis of the negative lens and the second positive lens in the second lens unit. By securing the thickness of the second positive lens by making an arrangement such that a value is not lower than a lower limit value in conditional expression (3), it becomes easy to suppress a fluctuation in an image plane curvature which is caused due to making a high zooming ratio. By making an arrangement such that a value is not higher than an upper limit value, it is possible to suppress the thickness of the second lens unit to a moderate level, and to make small the second lens unit, which is preferable from point of making the size small.

Moreover, it is preferable that, at the time of zooming from the wide angle end to the telephoto end, the first lens unit first moves toward the image side, and thereafter moves toward the object side, and that the third lens unit includes a positive lens component, and at the time of zooming from the wide angle end to the telephoto end, the third lens unit first moves toward the object side, and thereafter moves toward the image side.

It is possible to suppress the overall length of the zoom lens system from becoming long at one of the wide angle end and the telephoto end. Moreover, by moving the third lens unit as described above, a range of movement of the second lens unit is secured, and an oblique (off-axis) aberration near the intermediate focal length state is reduced, and an effect of increase in magnification near the telephoto end is secured.

Moreover, an arrangement may be made such that the third lens unit includes a positive lens component, and is positioned at the image side at the telephoto end with respect to the wide angle end, and focusing from a long-distance object to a short-distance object is carried out by moving the third lens unit toward the object side.

When characteristics of an image pickup element are favorable near a direction perpendicular to an image pickup surface, it is preferable to let the third lens unit to be the positive lens component. Moreover, by letting the third lens unit of which, a size can be made small, to be a focusing lens unit, it becomes easy to suppress a load on a drive system at the time of focusing.

Moreover, the third lens unit may include a negative lens component, and is positioned at the object side at the telephoto end with respect to the wide angle end, and focusing from a long-distance object to a short-distance object may be carried out by moving the third lens unit toward the image side.

When characteristics of an image pickup element are favorable in a direction inclined with respect to a perpendicular, in the vicinity of an image pickup surface, it is preferable to let the third lens unit to be a negative lens element. This is advantageous for making small a diameter of the zoom lens system. Moreover, by letting the third lens unit of which, the size can be made small easily, to be a focusing lens unit, it is possible to suppress the load on the drive system at the time of focusing.

Moreover, in a case of carrying out focusing by (at) the third lens unit including the positive lens component, it is preferable that the zoom lens system satisfies following conditional expression (4).

$$0.15 < 1 - \beta_{3T}^2 < 0.7 \tag{4}$$

where, $\beta_{3T}$ denotes a lateral magnification of the third lens unit at the time of focusing at an object at the longest distance, at the telephoto end.

A focusing sensitivity of the third lens unit depends on a magnifying power of the third lens unit. In order to be able to secure the focusing sensitivity of the third lens unit at the telephoto end, it is preferable to satisfy conditional expression (4).

By making an arrangement such that a value is not lower than a lower limit value in conditional expression (4) the focusing sensitivity is secured, and it is easy to suppress the amount of movement of the third lens unit at the time of focusing, and it is advantageous for making small a size of a drive mechanism. By making an arrangement such that a value is not higher than an upper limit value in conditional expression (4), it becomes easy to secure an accuracy of the focusing.

Moreover, it is preferable that the first lens unit includes two lenses in order from the object side thereof, namely, a negative lens and a positive lens.

When such an arrangement is made, it is possible to have a structure which can easily carry out balancing of an aberration such as the chromatic aberration, while making a size small when in use by letting principal points of the first lens unit toward the object. Moreover, this is effective for both, the maintenance of the optical performance and thinning of a lens frame when collapsed.

Moreover, it is preferable that the first lens unit includes in order from the object side thereof, a biconcave negative lens component, and a positive meniscus lens component having a convex surface directed toward the object side, and each lens component is a single lens, and that the second lens unit includes three lenses namely, a first positive lens, a negative lens, and a second positive lens, and that the third lens unit includes one lens.

Reducing the number of lenses in the arrangement is advantageous for a cost reduction. Moreover, by letting the lens arrangement as described above, it is easy to secure a size reduction and the optical performance.

Moreover, it is preferable that the zoom lens system satisfies the following conditional expression (5).

$$1.3 < C_{jmax}/f_t < 3.0 \tag{5}$$

where, $C_{jmax}$ denotes a maximum value of an overall length of the three-unit zoom lens system in a zoom range from the wide angle end to the telephoto end, and the overall length is a length obtained by adding a back focus expressed in an air conversion length, to an optical axial thickness from a surface of incidence of a lens nearest to the object up to a surface of emergence nearest to the image, of the three-unit zoom lens system.

Conditional expression (5) is an expression which regulates the maximum value of the overall length of the lens system with respect to a focal length of the zoom lens system at the telephoto end, and is a condition for making favorable a balance of thinning of the lens frame, and the aberration correction. By making an arrangement such that a value is not lower than a lower limit value in conditional expression (5), it becomes easy to suppress a power of each lens unit, and it is advantageous for correction of the oblique aberration in the first lens unit at the wide angle end, and an aberration such as a longitudinal aberration in the second lens unit, in a balanced manner. Moreover, it becomes easy to suppress an effect of aberration due to a manufacturing error. By making an arrangement such that a value is not higher than an upper limit value in conditional expression (5), the overall length of the zoom lens system is shortened.

Moreover, it is preferable that the zoom lens system satisfies the following conditional expression (6).

$$4.0 < C_j(w)/f_w < 10.0 \tag{6}$$

where, $C_j(w)$ denotes an overall length of the three-unit zoom lens system at the wide angle end, and the overall length is a length obtained by adding a back focus expressed in an air conversion length, to an optical axial thickness from a surface of incidence of a lens nearest to the object up to a surface of emergence nearest to the image, of the three-unit zoom lens system.

Conditional expression (6) is an expression which regulates the overall length of the zoom lens system at the wide angle end with respect to a focal length of the zoom lens system at the wide angle end, and is a condition for making easy both, the size reduction and securing of a zooming ratio. When an arrangement is made such that a value is not lower than a lower limit value in conditional expression (6), it becomes easy to suppress an increase in the overall length at the telephoto end. Or, it becomes easy to achieve the desired zooming ratio. When an arrangement is made such that a value is not higher than an upper limit value in conditional expression (6), a height of light rays at the first lens unit is suppressed from becoming high, and it is possible to prevent a diameter of the first lens unit from becoming large. Or, it becomes easy to suppress the overall length of the zoom lens system from becoming long, and to suppress an increase in the number of stages of collapsing of the lens frame.

Moreover, it is preferable that the zoom lens system satisfies the following conditional expression (7).

$$1.3 < C_j(t)/f_t < 2.5 \tag{7}$$

where, $C_j(t)$ denotes an overall length of the three-unit zoom lens system at the telephoto end, and the overall length is a length obtained by adding a back focus expressed in an air conversion length, to an optical axial thickness from a surface of incidence of a lens nearest to the object side up to a surface of emergence nearest to the image, of the three-unit zoom lens system.

Conditional expression (7) is an expression which regulates the overall length of the zoom lens system at the telephoto end by a focal length at the telephoto end, and is a condition for enabling to simplify further a structure of a lens barrel by shortening the overall length. When an arrangement is made such that a value is not lower than a lower limit value in conditional expression (7), it becomes easy to suppress an increase in the overall length at the telephoto end. Or, it becomes easy to achieve the desired zooming ratio. When an arrangement is made such that a value is not higher than an upper limit value in conditional expression (7), it is easy to suppress an overall length of the lens frame, which is advantageous for size reduction.

Moreover, it is preferable that the zoom lens system satisfies the following conditional expression (8).

$$-1.4 < f_{L11}/f_w < -0.3 \tag{8}$$

where, $f_{L11}$ denotes a focal length of the biconcave negative lens component in the first lens unit.

Even when a strong refracting power which satisfies conditional expression (8) is imparted to the negative lens element nearest to the object in the first lens unit which satisfies the abovementioned conditional expression (2), it is possible to have a high zooming ratio while correcting the aberration favorably, from an optical performance point of view. By securing the negative refracting power by making an arrangement such that a value is not lower than a lower limit value in conditional expression (8), it becomes easy to carry out size reduction and have a high zooming ratio. It is preferable to suppress the excess of the negative refracting power and to suppress an occurrence of the longitudinal aberration and the oblique aberration, by making an arrangement such that a value is not higher than an upper limit value in conditional expression (8).

Moreover, it is preferable that the zoom lens system satisfies the following conditional expression (9).

$$2.0 < f_{G2}/IH_w < 4.0 \tag{9}$$

where, $f_{G2}$ denotes a focal length of the second lens unit, and
$IH_w$ denotes an image height at the wide angle end.

By satisfying conditional expression (9), it is possible to carry out zooming by a small amount of movement even while securing the zooming ratio. It is preferable to suppress the refracting power of the second lens unit and to suppress an aberration by making an arrangement such that a value is not lower than a lower limit value in conditional expression (9). Moreover, it is preferable to secure the refracting power of the second lens unit and to suppress an increase in the amount of movement of the second lens unit by making an arrangement such that a value is not higher than an upper limit value in conditional expression (9).

Moreover, it is preferable that the zoom lens system satisfies the following conditional expression (10).

$$0.1 < D_{1G}/f_w < 1.5 \tag{10}$$

where, $D_{1G}$ denotes an optical axial thickness of the first lens unit.

For making small the overall length of the zoom lens system and a thickness when collapsed, it is preferable that the zoom lens system satisfies conditional expression (10). It is preferable to secure the optical axial thickness of the first lens unit and to secure the thickness of the lens which is necessary for securing the negative refracting power, and it is preferable to make an arrangement such that a value is not lower than a lower limit value in conditional expression (10). It is preferable to suppress the thickness of the first lens unit and not allow the thickness to be more than necessary by making an arrangement such that a value is not higher than an upper limit value in conditional expression (10).

Moreover, it is preferable that both, a lens surface nearest to the object and a lens surface nearest to the image in the second lens unit, are aspheric surfaces. Accordingly, it is possible to correct favorably the spherical aberration in each state from the wide angle end to the telephoto end.

Moreover, it is possible to use one of the zoom lens systems described above as an image forming lens of an image pickup apparatus. In other words, it is preferable to let the image pickup apparatus to be an image pickup apparatus which includes a three-unit zoom lens system, and an image pickup element which is disposed at an image side of the three-unit zoom lens system, and which changes an optical image formed by the three-unit zoom lens system, to an electric signal, and the three-lens zoom lens system is a zoom lens system according to one of described above.

Furthermore, it is preferable that the image pickup apparatus includes an image conversion section which converts an electric signal including a distortion due to the three-unit zoom lens system, to an image signal, in which the distortion is corrected by an image processing. Allowing the distortion of the three-unit zoom lens system is advantageous for a reduction in the number of lenses and a reduction in size of the three-unit zoom lens system.

All values to be used in each conditional expression mentioned above are values in a state of being focused to a longest distance object point, when the three-unit zoom lens system has a focusing function. Moreover, it is preferable that a plurality of arrangements mentioned above is satisfied simultaneously.

It is preferable to make the following arrangements in each conditional expression mentioned above.

It is preferable to let a lower limit value in conditional expression (1) to be 3.7, and a lower limit value of 3.8 is more preferable.

It is preferable to provide an upper limit value (in conditional expression (1)), and by making an arrangement such that a value is not higher 5.5, it becomes easy to suppress the refracting power of each lens unit, which is preferable from a point of reducing the number of lenses.

It is preferable to let a lower limit value in conditional expression (2) to be 0.3, and a lower limit value of 0.5 is more preferable.

It is preferable to let an upper limit value in conditional expression (2) to be 0.96.

It is preferable to let a lower limit value in conditional expression (3) to be 3.0, and a lower limit value of 3.5 is more preferable.

It is preferable to let an upper limit value in conditional expression (3) to be 6.0, and an upper limit value of 5.0 is more preferable.

It is preferable to let a lower limit value in conditional expression (4) to be 0.2, and a lower limit value of 0.5 is more preferable.

It is preferable to let an upper limit value in conditional expression (4) to be 0.5.

It is preferable to let a lower limit value in conditional expression (5) to be 1.6, and a lower limit value of 1.75 is more preferable.

It is preferable to let an upper limit value in conditional expression (5) to be 2.5, and an upper limit value of 2.0 is more preferable.

It is preferable to let a lower limit value in conditional expression (6) to be 5.0, and a lower limit value of 6.0 is more preferable.

It is preferable to let an upper limit value in conditional expression (6) to be 9.0, and an upper limit value of 8.5 is more preferable.

It is preferable to let a lower limit value in conditional expression (7) to be 1.5.

It is preferable to let an upper limit value in conditional expression (7) to be 2.0.

It is preferable to let a lower limit value in conditional expression (8) to be −1.35.

It is preferable to let an upper limit value in conditional expression (8) to be −0.5, and an upper limit value of 0.9 is more preferable.

It is preferable to let a lower limit value in conditional expression (9) to be 2.5, and a lower limit value of 2.7 is more preferable.

It is preferable to let an upper limit value in conditional expression (9) to be 3.5, and an upper limit value of 3.4 is more preferable.

It is preferable to let a lower limit value in conditional expression (10) to be 0.4, and a lower limit value of 0.7 is more preferable.

It is preferable to let an upper limit value in conditional expression (10) to be 1.3, and an upper limit value of 1.1 is more preferable.

It is preferable that each invention described above satisfies arbitrarily, a plurality of conditional expressions simultaneously. Moreover, regarding each conditional expression, only an upper limit value and a lower limit value in a range of numerical values of the more restricted conditional expression may be restricted. Moreover, various structures described above may be combined arbitrarily.

According to the present invention, there can be provided a three-unit zoom lens system, which is advantageous for securing the optical performance and size reduction while having a high zooming ratio, and an image pickup apparatus, which includes the three-unit zoom lens system.

Embodiments of the three-unit zoom lens system and the image pickup apparatus according to the present invention will be described below in detail by referring to the accompanying diagrams. However, the present invention is not restricted to the embodiments described below.

Each of the embodiments described below is a three-unit zoom lens system of a negative, positive, and positive refracting power type embodiments from a first embodiment to a fourth embodiment or a negative, positive, and negative refracting power type embodiments from a fifth embodiment to an eighth embodiment having a favorable optical performance in which, a high zooming ratio of about 4 is achieved, and a half image angle at a wide angle end of 35° and more is secured. In the first embodiment, the second embodiment, the fourth embodiment, and the fifth embodiment, an effective image pickup area in a full-zoom state is rectangular and constant.

Corresponding values in each conditional expression are values when focused to an infinite object point. The overall length is a length in which, a back focus is added to an optical axial distance from a surface of incidence to a surface of emergence of a lens. The back focus is indicated by an air-conversion length.

The first embodiment, the second embodiment, the fifth embodiment, and the sixth embodiment of the three-unit zoom lens system of the present invention will be described below. Lens cross-sectional views at the wide angle end (FIG. 1A, FIG. 2A, FIG. 10A, and FIG. 11A), at the intermediate focal length state (FIG. 1B, FIG. 2B, FIG. 10B, and FIG. 11B), and at the telephoto end (FIG. 1C, FIG. 2C, FIG. 10C, and FIG. 11C) at the time of infinite object point focusing are shown. In FIG. 1A to FIG. 1C, FIG. 2A to FIG. 2C, FIG. 10A to FIG. 10C, and FIG. 11A to FIG. 11C, G1 denotes a first lens unit, S denotes an aperture stop, G2 denotes a second lens unit, FS denotes a flare aperture, G3 denotes a third lens unit, F denotes a parallel flat plate which forms a low pass filter in which, a wavelength region restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have an effect of a low pass filter.

Moreover, in the first embodiment and the second embodiment, the aperture stop S and the flare aperture FS move integrally with the second lens unit G2, and in the fifth embodiment and the sixth embodiment, the aperture stop S moves integrally with the second lens unit G2. A unit of length for each value in mm, and a unit of angle is degree (°). Further, zoom data is values at the wide angle end (WE), the intermediate focal length state (ST), and the telephoto end (TE).

Figure 1B:
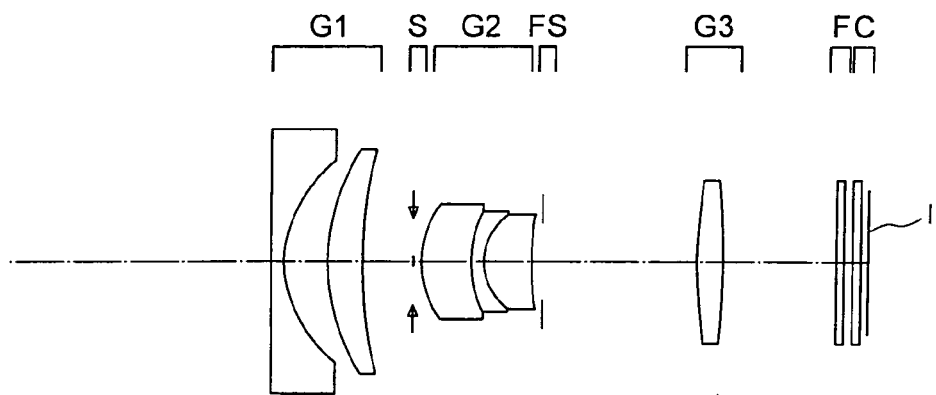
Figure 1C:
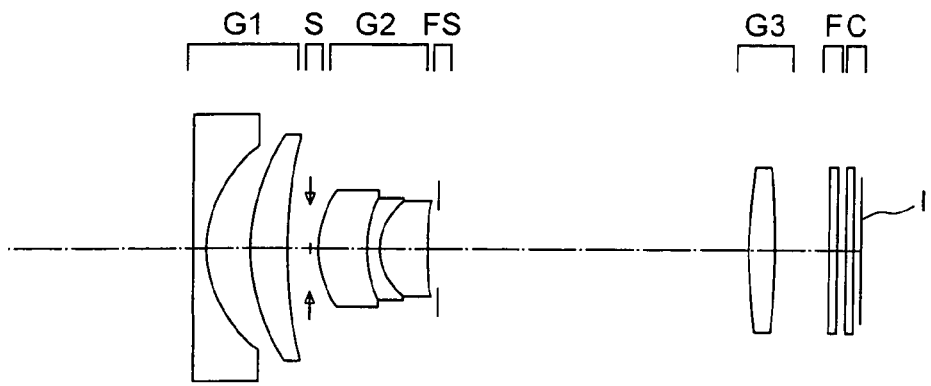

A zoom lens system in the first embodiment, as shown in FIG. 1A to FIG. 1C, includes in order from an object side thereof, a first lens unit G1 having a negative refracting power, an aperture stop S, a second lens unit G2 having a positive refracting power, a flare stop FS, and a third lens unit G3 having a positive refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side. The focusing is carried out by moving the third lens unit G3, and a focusing operation from a long-distance object point to a short-distance object point is carried out by moving the third lens unit G3 toward the object side.

In order from the object side, the first lens unit G1 includes a biconcave negative lens and a positive meniscus lens having a convex surface directed toward the object side. The second lens unit G2 includes a cemented lens of a positive meniscus lens having a convex surface directed toward the object side, a negative meniscus lens having a convex surface directed toward the object side, and a positive meniscus lens having a convex surface directed toward the object side. The third lens unit G3 includes a biconvex positive lens.

An aspheric surface is used for four surfaces namely a surface on the image side of the biconcave negative lens in the first lens unit G1, a surface on the object side of the positive meniscus lens nearest to the object and a surface on the image side of the positive meniscus lens nearest to the image in the second lens unit G2, and a surface on the object side of the biconvex positive lens in the third lens unit G3.

Figure 2A:
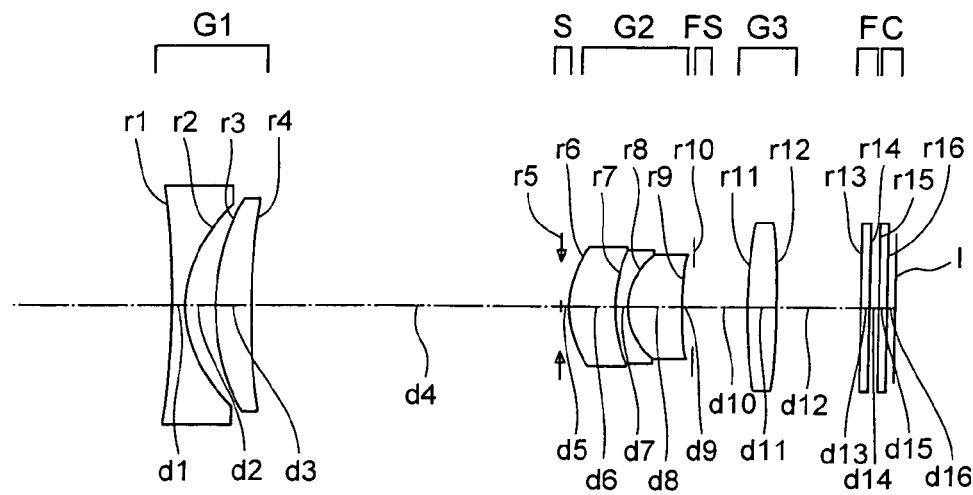
FIG. 2A, FIG. 2B, and FIG. 2C are diagrams similar to FIG. 1A, FIG. 1B, and FIG. 1C respectively, of a second embodiment of the zoom lens system according to the present invention.
Figure 2B:
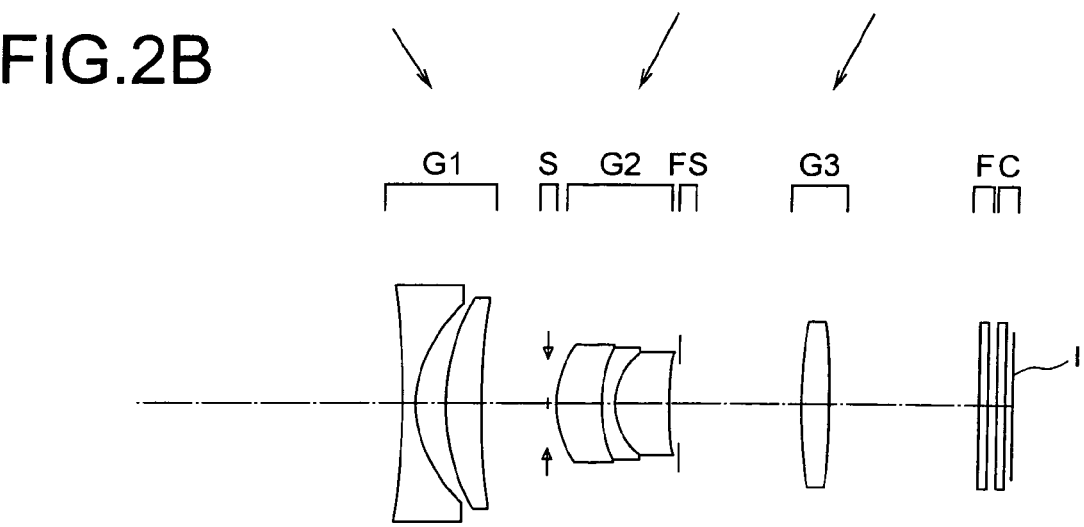
Figure 2C:
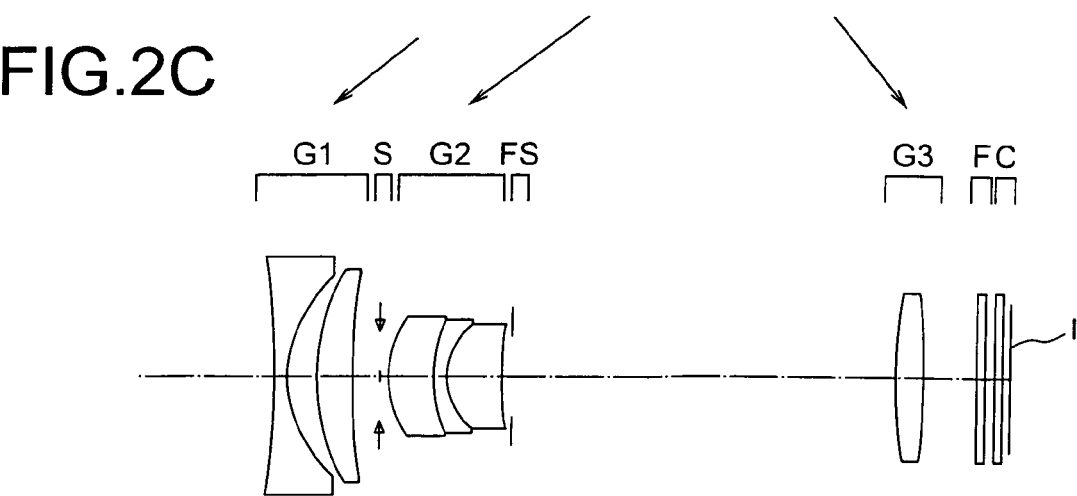
Figure 3A:
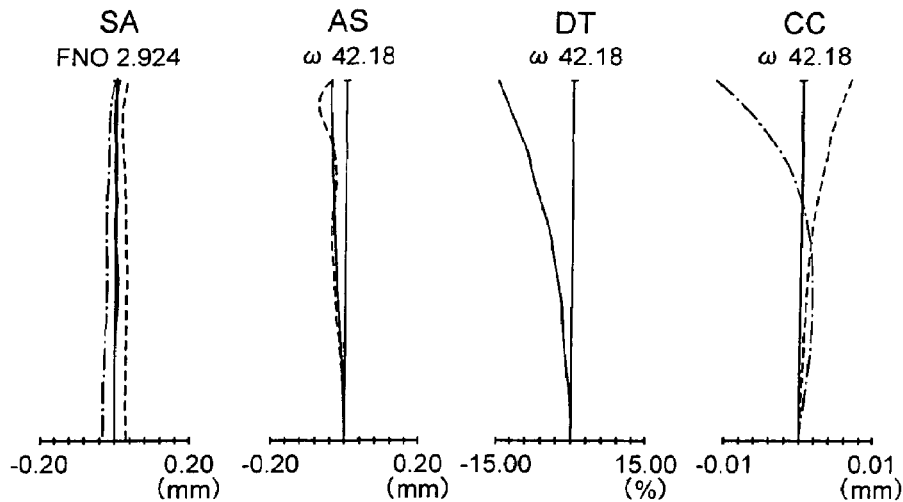
FIG. 3A, FIG. 3B, and FIG. 3C are diagrams showing a spherical aberration, an astigmatism, a distortion, and a chromatic aberration of magnification at the time of the infinite object point focusing, of the first embodiment, where.
Figure 3B:
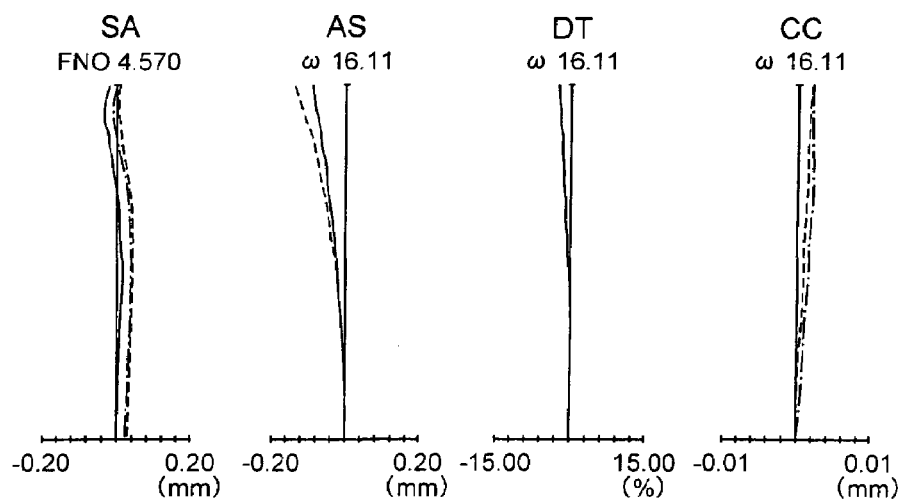
Figure 3C:
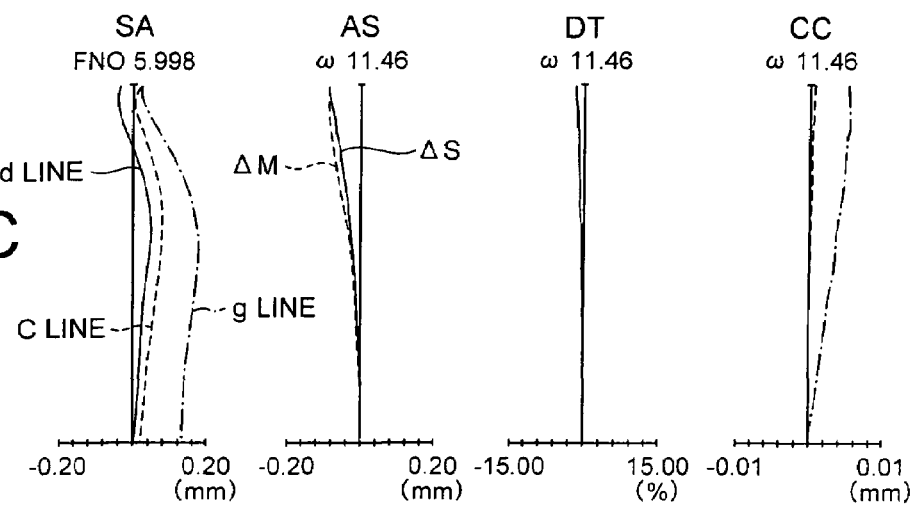
Figure 4A:
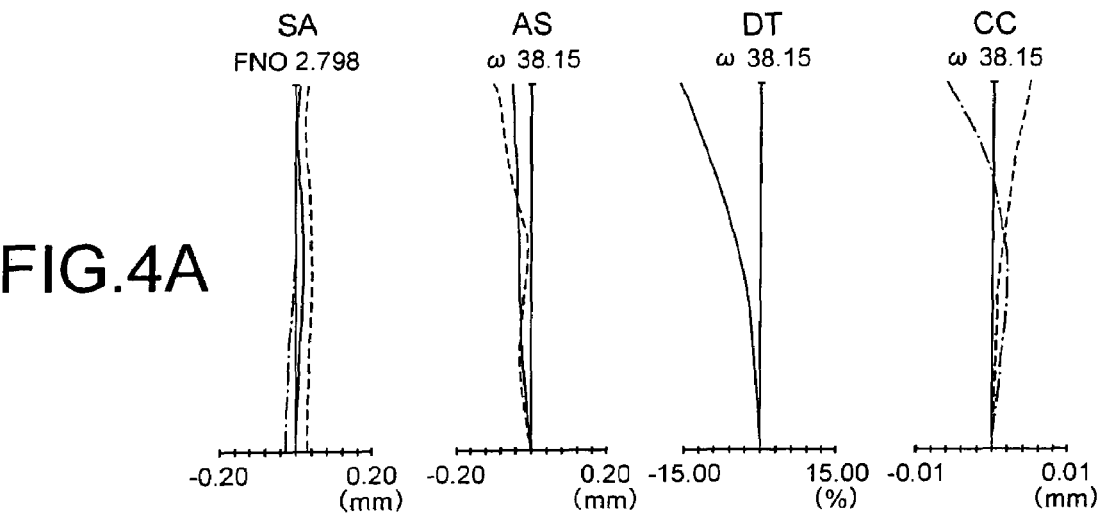
FIG. 4A, FIG. 4B, and FIG. 4C are diagrams similar to FIG. 3A, FIG. 3B, and FIG. 3C at the time of the infinite object point focusing, of the second embodiment.
Figure 4B:
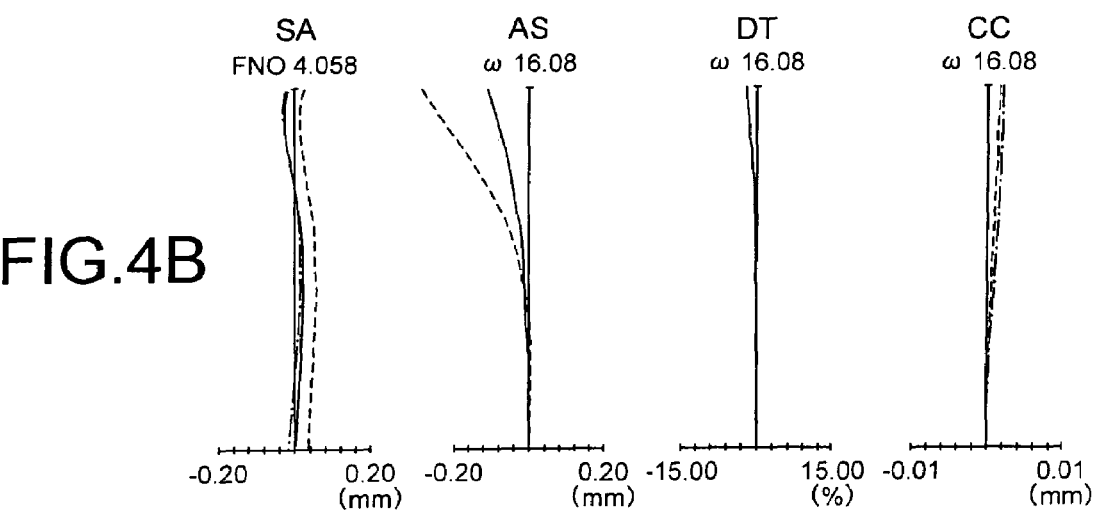
Figure 4C:
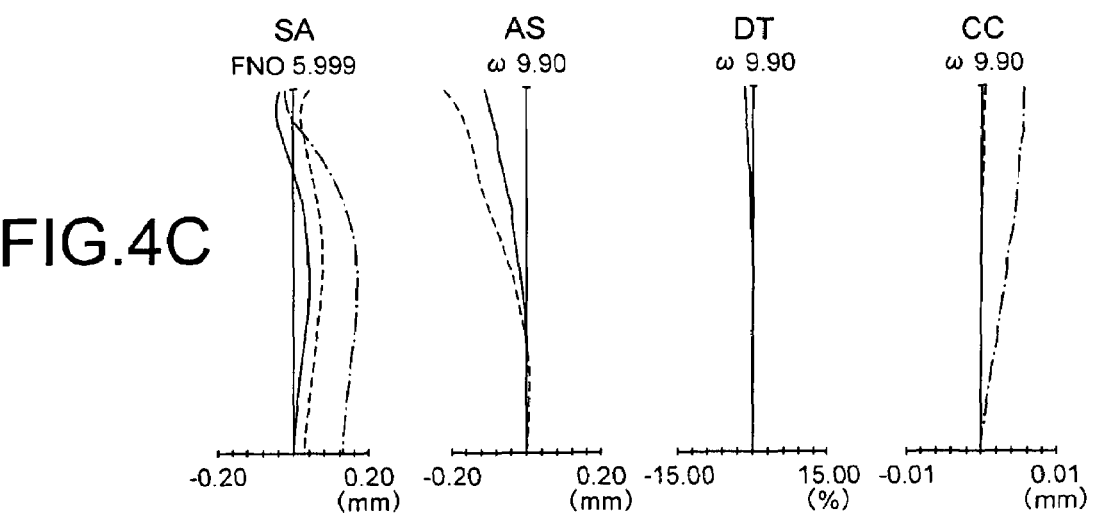

A zoom lens system in the second embodiment, as shown in FIG. 2A to FIG. 2C includes in order from the object side thereof, a first lens unit G1 having a negative refracting power, an aperture stop S, a second lens unit G2 having a positive refracting power, a flare aperture FS, and a third lens unit G3 having a positive refracting power.

At the time of zooming from the wide angle end to the telephoto end, the first lens unit G1, after moving toward the image side, moves toward the object side. The second lens unit G2 moves only toward the object side. The third lens unit G3, after moving toward the object side, moves toward the image side. The focusing is carried out by moving the third lens unit G3, and a focusing operation from a long-distance object point to a short-distance object point is carried out by moving the third lens unit G3 toward the object side.

In order from the object side, the first lens unit G1 includes a biconcave negative lens and a positive meniscus lens having a convex surface directed toward the object side. The second lens unit includes a cemented lens of a positive meniscus lens having a convex surface directed toward the object side, a negative meniscus lens having a convex surface directed toward the object side, and a positive meniscus lens having a convex surface directed toward the object side. The third lens unit G3 includes a biconvex positive lens.

An aspheric surface is used for four surfaces namely, a surface on the image side of the biconcave negative lens in the first lens unit, a surface on the object side of the positive meniscus lens nearest to the object, and a surface on the image side of the positive meniscus lens nearest to the image in the second lens unit G2, and a surface on the object side of the biconvex positive lens in the third lens unit G3.

Figure 10A:
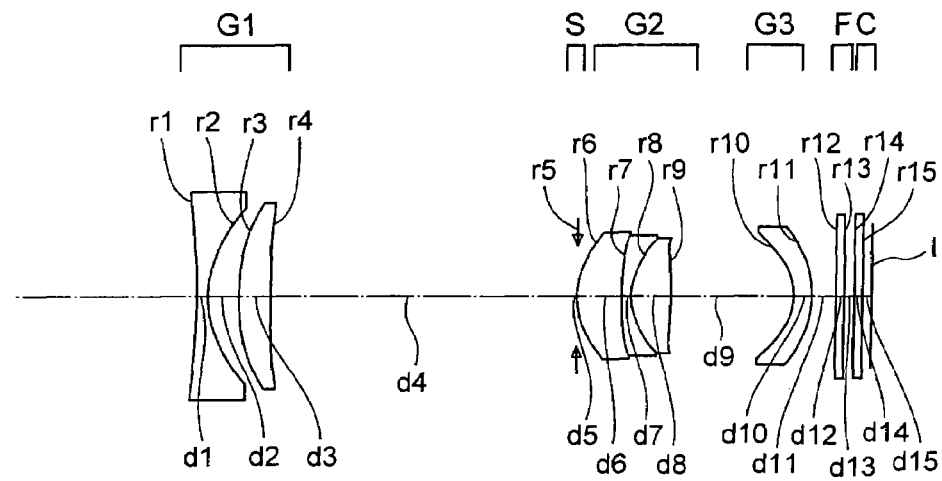
FIG. 10A, FIG. 10B, and FIG. 10C are diagrams similar to FIG. 1A, FIG. 1B, and FIG. 1C respectively, of a fifth embodiment of the zoom lens system according to the present invention.
Figure 10B:
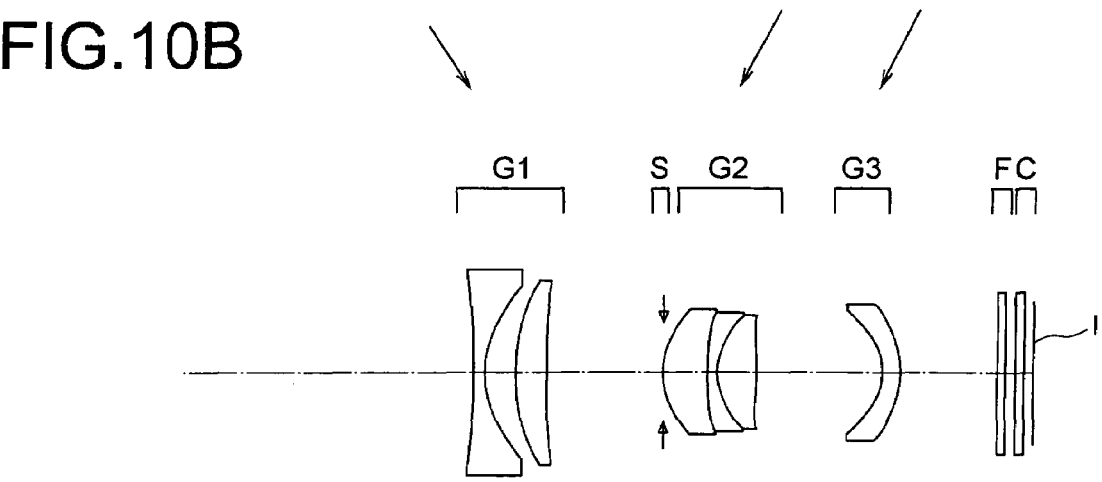
Figure 10C:
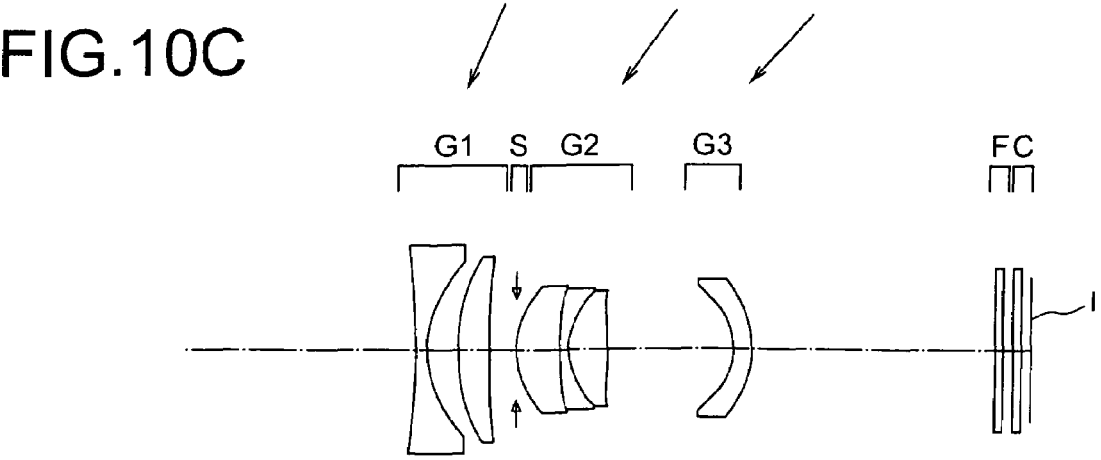

A zoom lens system in the fifth embodiment, as shown in FIG. 10A to FIG. 10C, includes, in order from the object side thereof, a first lens unit G1 having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side. The focusing is carried out by moving the third lens unit G3. A focusing operation from a long-distance object point to a short-distance object point is carried out by moving the third lens unit G3 toward the image side.

In order from the object side, the first lens unit G1 includes a biconcave negative lens, and a positive meniscus lens having a convex surface directed toward the object side. The second lens unit G2 includes a cemented lens of a positive meniscus lens having a convex surface directed toward the object side, a negative meniscus lens having a convex surface directed toward the object side, and a biconvex positive lens. The third lens unit G3 includes a negative meniscus lens having a convex surface directed toward the image side.

An aspheric surface is used for five surfaces namely, a surface on the object side and a surface on the image side of the biconcave negative lens in the first lens unit G1, a surface on the object side of the positive meniscus lens nearest to the object, and a surface on the image side of the biconvex positive lens nearest to the image in the second lens unit G2, and a surface on the object side of the negative meniscus lens in the third lens unit G3.

Figure 11A:
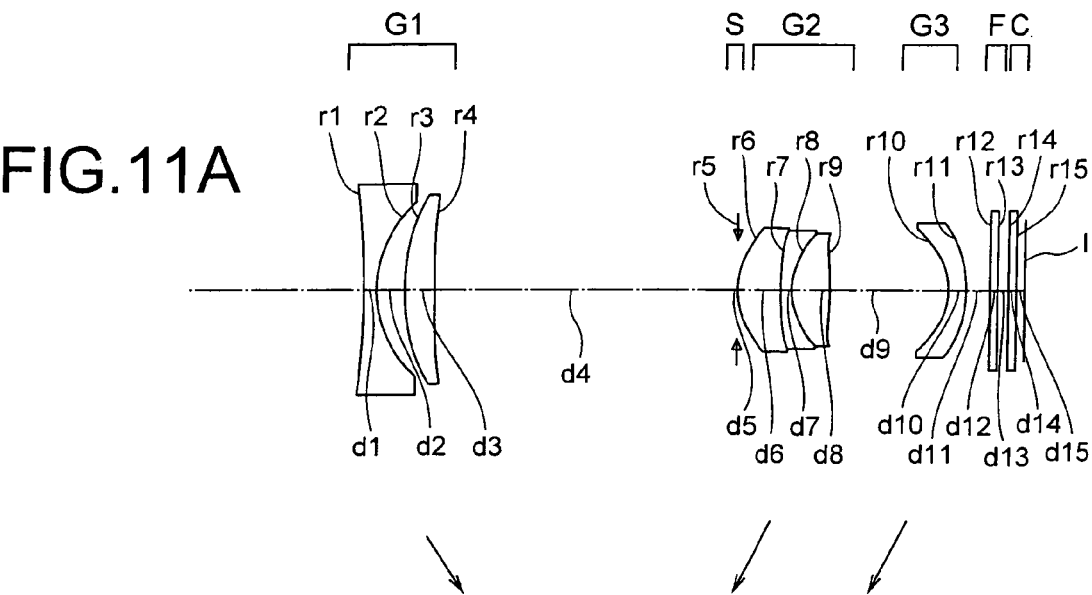
FIG. 11A, FIG. 11B, and FIG. 11C are diagrams similar to FIG. 1A, FIG. 1B, and FIG. 1C respectively, of a sixth embodiment of the zoom lens system according to the present invention.
Figure 11B:
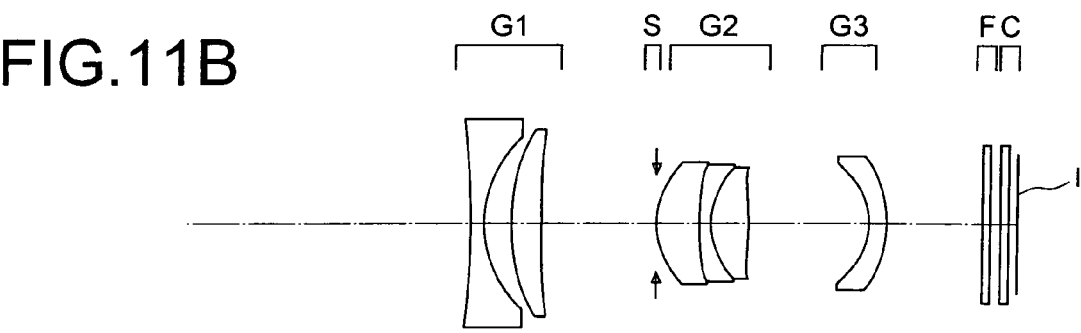
Figure 11C:
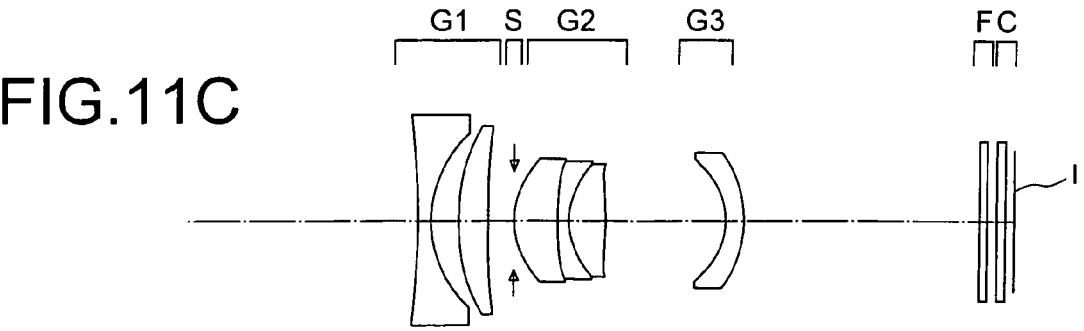
Figure 12A:
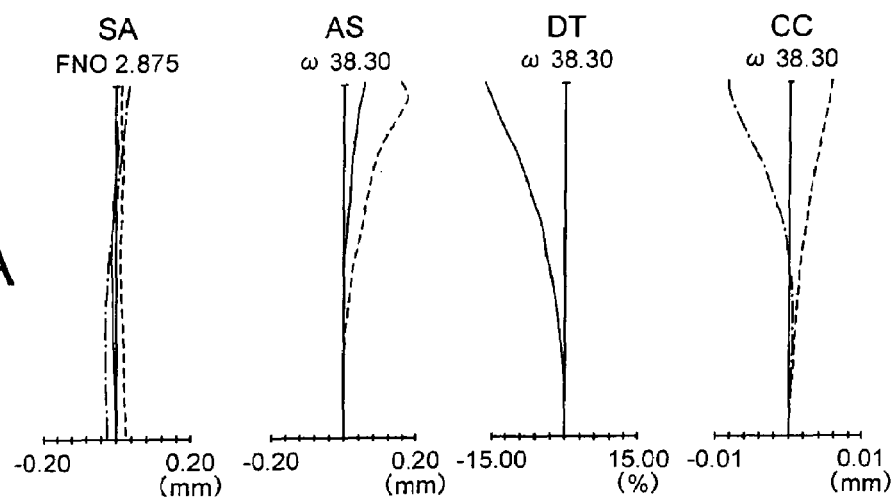
FIG. 12A, FIG. 12B, and FIG. 12C are diagrams similar to FIG. 3A, FIG. 3B, and FIG. 3C respectively, at the time of the infinite object point focusing of the fifth embodiment.
Figure 12B:
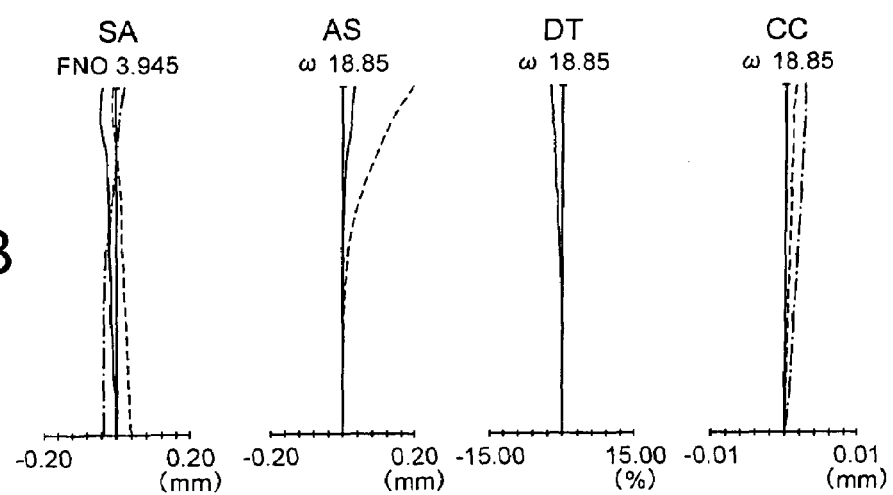
Figure 12C:
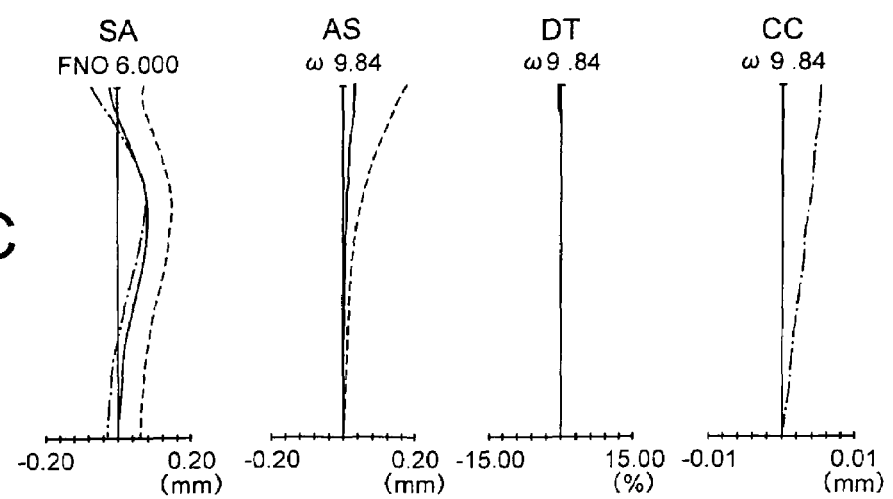
Figure 13A:
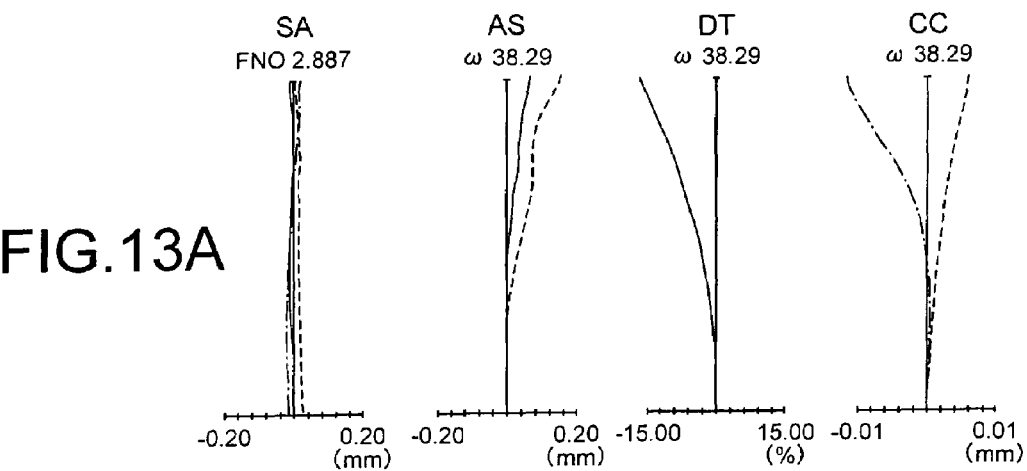
FIG. 13A, FIG. 13B, and FIG. 13C are diagrams similar to FIG. 3A, FIG. 3B, and FIG. 3C respectively, at the time of the infinite object point focusing of the sixth embodiment.
Figure 13B:
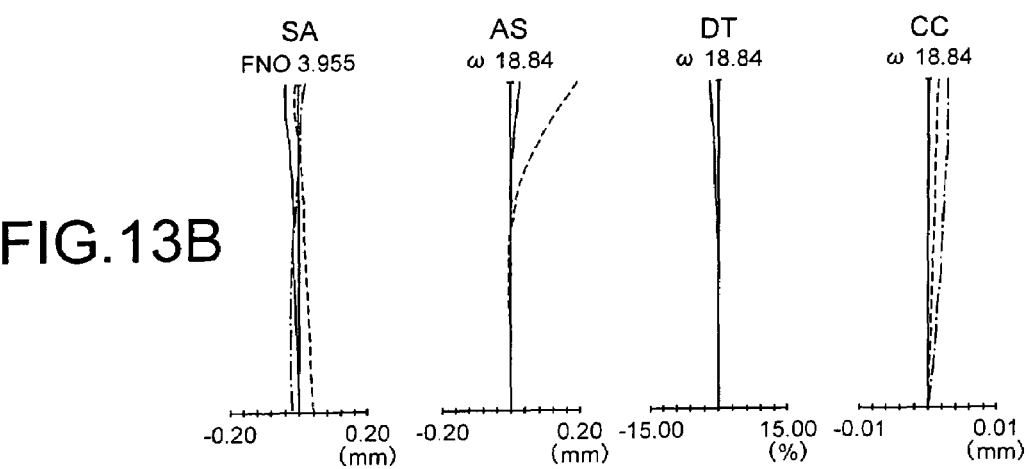
Figure 13C:
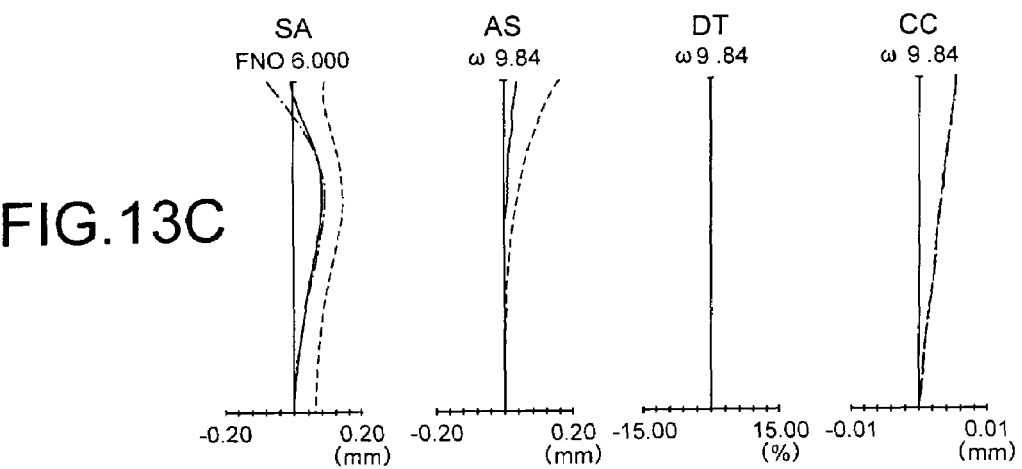

A zoom lens system in the sixth embodiment, as shown in FIG. 11A to FIG. 11C, includes, in order from the object side thereof, a first lens unit having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side. The focusing is carried out by moving the third lens unit G3. A focusing operation from a long-distance object point to a short-distance object point is carried out by moving the third lens unit G3 toward the image side.

In order from the object side, the first lens unit G1 includes a biconcave negative lens and a positive meniscus lens having a convex surface directed toward the object side. The second lens unit G2 includes a cemented lens of a positive meniscus lens having a convex surface directed toward the object side, a negative meniscus lens having a convex surface directed toward the object side, and a biconvex positive lens. The third lens unit G3 includes a negative meniscus lens having a convex surface directed toward the image side.

An aspheric surface is used for five surfaces namely, a surface on the object side and a surface on the image side of the biconcave negative lens in the first lens unit G1, a surface on the object side of the positive meniscus lens nearest to the object, and a surface on the image side of the biconvex positive lens nearest to the image in the second lens unit G2, and a surface on the object side of the negative meniscus lens in the third lens unit G3.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens. When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A4y^4+A6y^6+A8y^8+A10y^{10}+A12y^{12}$$

where, r denotes a paraxial radius of curvature, K denotes a conical coefficient, $A4$, $A6$, $A8$, $A10$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "A" means that the surface is an aspheric surface, and "S" means that the surface is an aperture stop, "FS" means that the surface is a flare stop.

EXAMPLE 1 unit:mm

Surface data

| Surface No | r | d | nd | vd |
|---|---|---|---|---|
| 1 | −234.370 | 0.70 | 1.83481 | 42.71 |
| 2* | 5.778 | 2.42 | | |
| 3 | 11.366 | 2.00 | 2.00069 | 25.46 |
| 4 | 27.645 | Variable | | |
| 5(AS) | ∞ | 0.40 | | |
| 6* | 5.381 | 2.88 | 1.85135 | 40.10 |
| 7 | 6.887 | 0.70 | 1.84666 | 23.78 |
| 8 | 3.222 | 2.76 | 1.58313 | 59.46 |
| 9* | 36.164 | 0.55 | | |
| 10(FS) | | Variable | | |
| 11* | 33.961 | 1.49 | 1.53113 | 55.80 |
| 12 | −42.368 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.35 | | |
| Image plane(Light receiving surface) ∞ | | | | |

Aspherical coefficients

2nd surface k = −0.300, A4 = −2.71430e−04, A6 = −5.48669e−06, A8 = 4.19156e−08, A10 = −4.40931e−09

6th surface k = −3.415, A4 = 2.55760e−03, A6 = −6.32878e−05, A8 = 3.24082e−06, A10 = −9.18564e−08

9th surface k = −0.278, A4 = 1.66713e−03, A6 = 1.16596e−04, A8 = −1.14917e−05, A10 = 1.70240e−06

11th surface k = 0.000, A4 = 5.57083e−05, A6 = 6.53176e−06, A8 = −1.61759e−07, A10 = 8.08029e−10

Group focal length

| G1 | G2 | G3 |
|---|---|---|
| f1 = −12.70 | f2 = 10.80 | f3 = 35.73 |

Zoom data

| | WE | ST | TE |
|---|---|---|---|
| IH | 3.84 | 3.84 | 3.84 |
| f(mm) | 5.00 | 13.59 | 19.29 |
| Fno. | 2.92 | 4.57 | 6.00 |
| 2ω(°) | 84.36 | 32.23 | 22.93 |
| Lens total length | 40.32 | 33.39 | 37.53 |
| BF | 5.02 | 7.87 | 4.44 |
| d4 | 18.35 | 2.89 | 1.30 |
| d10 | 2.97 | 8.65 | 17.81 |
| d12 | 3.51 | 6.37 | 2.93 |

EXAMPLE 2 unit:mm

Surface data

| Surface No | r | d | nd | vd |
|---|---|---|---|---|
| 1 | −37.259 | 0.70 | 1.80610 | 40.92 |
| 2* | 5.880 | 1.60 | | |
| 3 | 11.297 | 2.00 | 2.00069 | 25.46 |
| 4 | 47.964 | Variable | | |
| 5(AS) | | 0.40 | | |
| 6* | 5.606 | 2.56 | 1.85135 | 40.10 |
| 7 | 7.382 | 0.70 | 1.84666 | 23.78 |
| 8 | 3.555 | 3.00 | 1.58313 | 59.46 |
| 9* | 35.301 | 0.55 | | |
| 10(FS) | | Variable | | |
| 11* | 29.105 | 1.49 | 1.53113 | 55.80 |
| 12 | −63.276 | Variable | | |
| 13 | ∞ | 0.50 | 1.51633 | 64.14 |
| 14 | ∞ | 0.50 | | |
| 15 | ∞ | 0.50 | 1.51633 | 64.14 |
| 16 | ∞ | 0.35 | | |
| Image plane(Light receiving surface) ∞ | | | | |

Aspherical coefficients

2nd surface k = −4.002, A4 = 1.79389e−03, A6 = −5.26296e−05, A8 = 1.15306e−06, A10 = −1.22438e−08

6th surface k = −3.358, A4 = 2.22136e−03, A6 = −4.49616e−05, A8 = 2.03611e−06, A10 = −4.19282e−08

9th surface k = −0.278, A4 = 1.46390e−03, A6 = 6.22492e−05, A8 = 2.84552e−06, A10 = 1.52230e−07

11th surface k = 0.000, A4 = −9.47610e−05, A6 = 2.61128e−05, A8 = −1.53481e−06, A10 = 3.51661e−08

Group focal length

| G1 | G2 | G3 |
|---|---|---|
| f1 = −13.29 | f2 = 11.36 | f3 = 37.74 |

Zoom data

| | WE | ST | TE |
|---|---|---|---|
| IH | 3.84 | 3.84 | 3.84 |
| f(mm) | 5.80 | 13.59 | 22.30 |
| Fno. | 2.80 | 4.06 | 6.00 |
| 2ω(°) | 76.30 | 32.16 | 19.80 |
| Lens total length | 39.29 | 33.51 | 40.53 |
| BF | 6.18 | 9.83 | 4.42 |
| d4 | 17.06 | 3.76 | 1.60 |
| d10 | 2.97 | 6.83 | 21.42 |
| d12 | 4.67 | 8.32 | 2.91 |

EXAMPLE 5 unit:mm

Surface data

| Surface No | r | d | nd | vd |
|---|---|---|---|---|
| 1* | −113.961 | 0.70 | 1.88300 | 40.76 |
| 2* | 5.940 | 1.65 | | |
| 3 | 10.858 | 1.73 | 1.84666 | 23.78 |
| 4 | 50.171 | Variable | | |
| 5(AS) | ∞ | 0.00 | | |
| 6* | 4.509 | 2.40 | 1.51633 | 64.14 |
| 7 | 10.100 | 0.54 | 1.90366 | 31.32 |
| 8 | 3.983 | 2.15 | 1.62263 | 58.16 |
| 9* | −24.449 | Variable | | |
| 10* | −3.808 | 1.00 | 1.49700 | 81.54 |
| 11 | −5.865 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane(Light receiving surface) ∞ | | | | |

Aspherical coefficients

1st surface $k = 0.000, A4 = -5.53177e-04, A6 = 3.25017e-05,$
$A8 = -8.64611e-07, A10 = 8.14308e-09$ 2nd surface $k = 0.000, A4 = -1.03578e-03, A6 = 2.37354e-05,$
$A8 = -4.40077e-07, A10 = -2.03801e-08$ 6th surface $k = -0.246, A4 = -1.98445e-04, A6 = -1.40006e-05,$
$A8 = 1.28259e-06, A10 = 0.000$ 9th surface $k = 13.738, A4 = 1.07699e-03, A6 = 1.12355e-05,$
$A8 = 1.16855e-06, A10 = 6.46670e-07$ 10th surface $k = -0.461, A4 = -7.07395e-04, A6 = -5.05995e-05,$
$A8 = -6.19626e-07, A10 = -1.06047e-07$

Group focal length

| G1 | G2 | G3 |
|---|---|---|
| f1 = −12.40 | f2 = 9.28 | f3 = −26.06 |

Zoom data

| | WE | ST | TE |
|---|---|---|---|
| IH | 3.84 | 3.84 | 3.84 |
| f(mm) | 5.80 | 11.50 | 22.20 |
| Fno. | 2.87 | 3.95 | 6.00 |
| 2ω(°) | 76.60 | 37.70 | 19.69 |
| Lens total length | 36.66 | 30.71 | 33.96 |
| BF | 3.03 | 7.13 | 15.30 |
| d4 | 16.69 | 6.44 | 1.50 |
| d9 | 6.77 | 6.98 | 6.99 |
| d11 | 1.30 | 5.40 | 13.58 |

EXAMPLE 6 unit:mm

Surface data

| Surface No | r | d | nd | vd |
|---|---|---|---|---|
| 1* | −62.729 | 0.70 | 1.88300 | 40.76 |
| 2* | 5.852 | 1.51 | | |
| 3 | 11.451 | 1.66 | 2.00069 | 25.46 |
| 4 | 56.559 | Variable | | |
| 5(AS) | ∞ | 0.00 | | |
| 6* | 4.483 | 2.40 | 1.51633 | 64.14 |
| 7 | 11.667 | 0.62 | 1.90366 | 31.32 |
| 8 | 4.172 | 2.15 | 1.62263 | 58.16 |
| 9* | −23.523 | Variable | | |
| 10* | −4.173 | 1.00 | 1.49700 | 81.54 |
| 11 | −6.653 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane(Light receiving surface) ∞ | | | | |

Aspherical coefficients

1st surface $k = 0.000, A4 = -5.96485e-04, A6 = 3.58482e-05,$
$A8 = -9.13819e-07, A10 = 7.87055e-09$ 2nd surface $k = 0.000, A4 = -1.17758e-03, A6 = 2.71790e-05,$
$A8 = -4.34015e-07, A10 = -2.58636e-08$ 6th surface $k = -0.271, A4 = -1.55770e-04, A6 = -1.24411e-05,$
$A8 = 1.56677e-06, A10 = 0.000$ 9th surface $k = 5.238, A4 = 1.15790e-03, A6 = 1.61626e-05,$
$A8 = 1.90077e-06, A10 = 7.47798e-07$ 10th surface $k = -0.261, A4 = -2.50820e-04, A6 = -2.61630e-05,$
$A8 = -1.29687e-06, A10 = 4.23771e-08$

Group focal length

| G1 | G2 | G3 |
|---|---|---|
| f1 = −12.65 | f2 = 9.29 | f3 = −26.01 |

Zoom data

| | WE | ST | TE |
|---|---|---|---|
| IH | 3.84 | 3.84 | 3.84 |
| f(mm) | 5.80 | 11.50 | 22.20 |
| Fno. | 2.89 | 3.95 | 6.00 |
| 2ω(°) | 76.57 | 37.67 | 19.67 |
| Lens total length | 36.66 | 30.49 | 33.46 |
| BF | 3.03 | 7.10 | 15.13 |
| d4 | 16.94 | 6.53 | 1.50 |
| d9 | 6.65 | 6.82 | 6.82 |
| d11 | 1.30 | 5.38 | 13.40 |

Aberration diagrams at the time of the infinite object point focusing of the first embodiment, the second embodiment, the fifth embodiment, and the sixth embodiment are shown in FIG. 3A to FIG. 3C, FIG. 4A to FIG. 4C, FIG. 12A to FIG. 12C, and FIG. 13A to FIG. 13C respectively. In these aberration diagrams, FIG. 3A, FIG. 4A, FIG. 12A, and FIG. 13A show a spherical aberration, an astigmatism, a distortion, and a chromatic aberration of magnification respectively, at the wide angle end, FIG. 3B, FIG. 4B, FIG. 12B, and FIG. 13B shows a spherical aberration, an astigmatism, a distortion, and a chromatic aberration of magnification respectively, at the intermediate focal length state, and FIG. 3C, FIG. 4C, FIG. 12C, and FIG. 13C show a spherical aberration, an astigmatism, a distortion, and a chromatic aberration of magnification at the telephoto end. In each diagram, 'ω' shows a half image angle.

Next, the three-unit zoom lens system according to the third embodiment, the fourth embodiment, the seventh embodiment, and the eighth embodiment will be described below. The third embodiment and the fourth embodiment are examples in which the zoom lens system in the first embodiment and the second embodiment respectively are used, and the seventh embodiment and the eighth embodiment are examples in which the zoom lens system in the fifth embodiment and the sixth embodiment respectively are used, and these are embodiments in which an image pickup apparatus in which the distortion is corrected electrically is used. In these examples, a shape of the effective image pickup area changes at the time of zooming. Therefore, they differ from embodiments in which the image height and the image angle in a zoom state correspond. In this manner, the three-unit zoom lens system according to the third embodiment has the same arrangement as the three-unit zoom lens system of the first embodiment. The three-unit zoom lens system according to the fourth embodiment has the same arrangement as the three-unit zoom lens system of the second embodiment. The three-unit zoom lens system according to the seventh embodiment has the same structure as the three-unit zoom lens system of the fifth embodiment. The three-unit zoom lens system according to the eighth embodiment has the same structure as the three-unit zoom lens system of the sixth embodiment. Therefore, the description to be repeated is omitted. Moreover, the image pickup apparatus is an image pickup apparatus which includes a zoom lens system having a half image angle of 34° and more, at the wide angle end.

In the third embodiment, the fourth embodiment, the seventh embodiment, and the eighth embodiment, an image is recorded and displayed upon correcting electrically a barrel distortion which occurs at the wide angle side. In the zoom lens system of these embodiments, the barrel distortion occurs at the wide angle end, on a rectangular photoelectric conversion surface. Whereas, at the telephoto end, and near the intermediate focal length state, an occurrence of distortion is suppressed.

For correcting the distortion electrically, the effective image pickup area is let to be barrel shaped at the wide angle end, and rectangular shaped at the intermediate focal length state and the telephoto end. Moreover, the effective image pickup area which is set in advance is subjected to image conversion by an image processing, and is converted to rectangular image information in which the distortion is reduced. An arrangement is made such that the image height $IH_w$ at the wide angle end becomes smaller than the image height $IH_s$ in the intermediate focal length state, and the image height $IH_t$ at the telephoto end.

In the third embodiment, the fourth embodiment, the seventh embodiment, and the eighth embodiment, an arrangement is made such that, at the wide angle end, a length in a direction of short side of the photoelectric conversion surface is same as a length in a direction of short side of the effective image pickup area, and the effective image pickup area is set to be such that about −3% of distortion remains after the image processing. As matter of course, an arrangement may be made such that, an image in which, a barrel shaped area smaller than this is converted to a rectangular shape as the effective image pickup area, is let to be an image which is recorded and reproduced.

The zoom data of the third embodiment is given below.

| Zoom data | | | |
|---|---|---|---|
| | WE | ST | TE |
| IH | 3.58 | 3.84 | 3.84 |
| f(mm) | 5.00 | 13.59 | 19.29 |
| Fno. | 2.92 | 4.57 | 6.00 |
| 2ω(°) | 79.02 | 32.23 | 22.93 |

The zoom data of the fourth embodiment is given below.

| Zoom data | | | |
|---|---|---|---|
| | WE | ST | TE |
| IH | 3.57 | 3.84 | 3.84 |
| f(mm) | 5.80 | 13.59 | 22.30 |
| Fno. | 2.80 | 4.06 | 6.00 |
| 2ω(°) | 70.65 | 32.16 | 19.80 |

The zoom data of the seventh embodiment is given below.

| Zoom data | | | |
|---|---|---|---|
| | WE | ST | TE |
| IH | 3.57 | 3.84 | 3.84 |
| f(mm) | 5.80 | 11.50 | 22.20 |
| Fno. | 2.87 | 3.95 | 6.00 |
| 2ω(°) | 70.87 | 37.70 | 19.69 |

The zoom data of the eighth embodiment is given below.

| Zoom data | | | |
|---|---|---|---|
| | WE | ST | TE |
| IH | 3.57 | 3.84 | 3.84 |
| f(mm) | 5.80 | 11.50 | 22.20 |
| Fno. | 2.89 | 3.95 | 6.00 |
| 2ω(°) | 70.91 | 37.67 | 19.67 |

Values of conditional expressions (1) to (10) in the embodiments are given below.

| | Example 1 | Example 2 | Example 3 | Example 4 |
|---|---|---|---|---|
| (1)$f_t/f_w$ | 3.86 | 3.85 | 3.86 | 3.85 |
| (2)$(r_{L11f}+r_{L11r})/(r_{L11f}-r_{L11r})$ | 0.95 | 0.73 | 0.95 | 0.73 |
| (3)$D_{L23}/D_{L22}$ | 3.94 | 4.29 | 3.94 | 4.29 |
| (4)$1-\beta_{3T}^2$ | 0.26 | 0.25 | 0.26 | 0.25 |
| (5)$C_{jmax}/f_t$ | 2.09 | 1.76 | 2.09 | 1.76 |
| (6)$C_j(w)/f_w$ | 8.07 | 6.78 | 8.07 | 6.78 |
| (7)$C_j(t)/f_t$ | 1.95 | 1.82 | 1.95 | 1.82 |
| (8)$f_{L11}/f_w$ | −1.35 | −1.08 | −1.35 | −1.08 |
| (9)$f_{G2}/IH_w$ | 2.81 | 2.96 | 3.02 | 3.18 |
| (10)$D_{1G}/f_w$ | 1.02 | 0.74 | 1.02 | 0.74 |

-continued

|  | Example 5 | Example 6 | Example 7 | Example 8 |
|---|---|---|---|---|
| (1)$f_t/f_w$ | 3.83 | 3.83 | 3.83 | 3.83 |
| (2)$(r_{L11f}+r_{L11r})/(r_{L11f}-r_{L11r})$ | 0.90 | 0.83 | 0.90 | 0.83 |
| (3)$D_{L23}/D_{L22}$ | 3.95 | 3.46 | 3.95 | 3.46 |
| (4)$1-\beta_{3T}^2$ | — | — | — | — |
| (5)$C_{jmax}/f_t$ | 1.65 | 1.65 | 1.65 | 1.65 |
| (6)$C_j(w)/f_w$ | 6.32 | 6.32 | 6.32 | 6.32 |
| (7)$C_j(t)/f_t$ | 1.53 | 1.51 | 1.53 | 1.51 |
| (8)$f_{L11}/f_w$ | −1.10 | −1.04 | −1.10 | −1.04 |
| (9)$f_{G2}/IH_w$ | 2.42 | 2.42 | 2.60 | 2.60 |
| (10)$D_{1G}/f_w$ | 0.70 | 0.67 | 0.70 | 0.67 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 5:
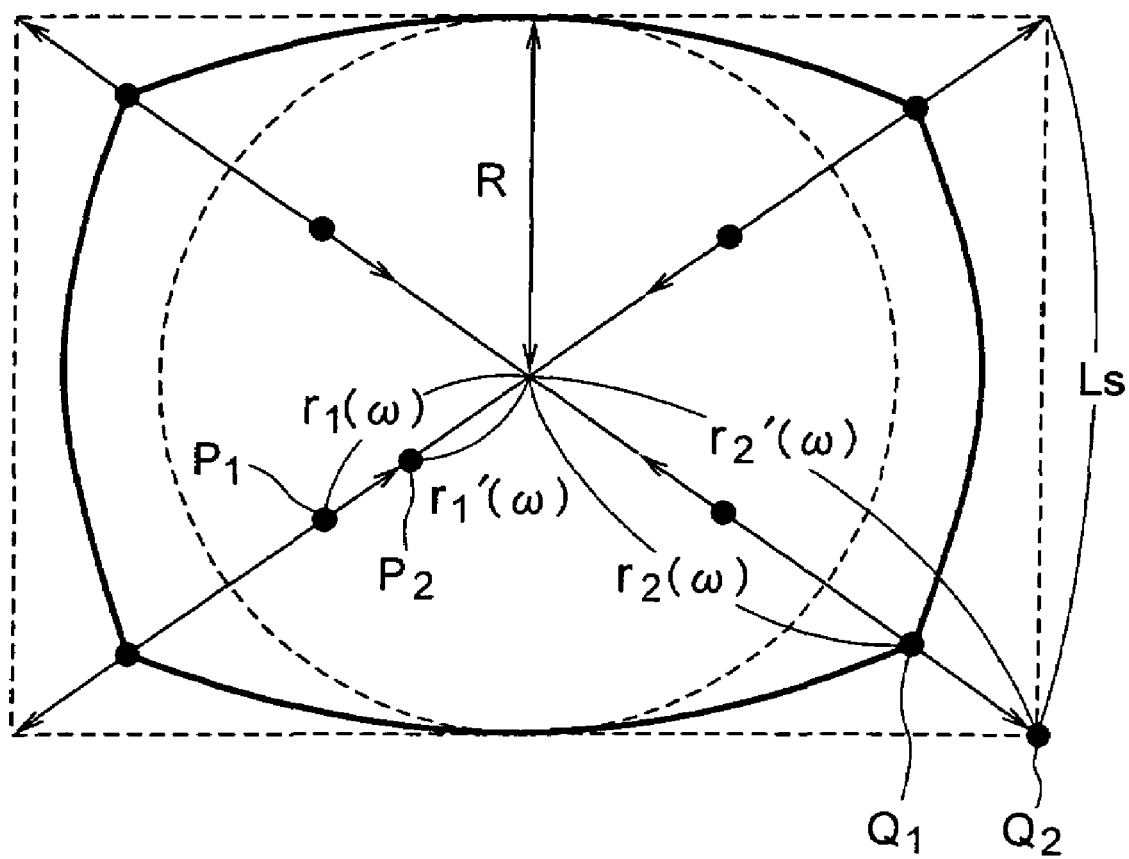
FIG. 5 is a diagram describing a correction of distortion.

For example, as shown in FIG. 5, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 5, a point $P_1$ on a circumference of an arbitrary radius $r_1$(ω) positioned at an inner side of a circle of radius R is moved to a point $P_2$ on a circumference of a radius $r_1$'(ω) which is to be corrected, directed toward a center of the circle. Moreover, a point $Q_1$ on a circumference of an arbitrary radius $r_2$ (ω) positioned at an outer side of the circle of radius R is moved to a point $Q_2$ on a circumference of a radius $r_2$'(ω) which is to be corrected, directed toward a direction away from the center of the circle.

Here, r'(ω) can be expressed as follows.

$$r'(\omega)=\alpha \cdot f \tan \omega (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a shorter side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$0 \leq R \leq 0.6 Ls$ where, Ls is a length of a short side of the effective image pickup surface.

It is preferable that the radius R satisfies the following conditional expression.

$0.3 Ls \leq R \leq 0.6 Ls$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $r'(\omega) = \alpha \cdot f \tan \omega$ near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $r'(\omega) = \alpha \cdot f \tan \omega$ near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $f = y/\tan \omega$ holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of ω becomes large.

(Digital Camera)

Figure 6:
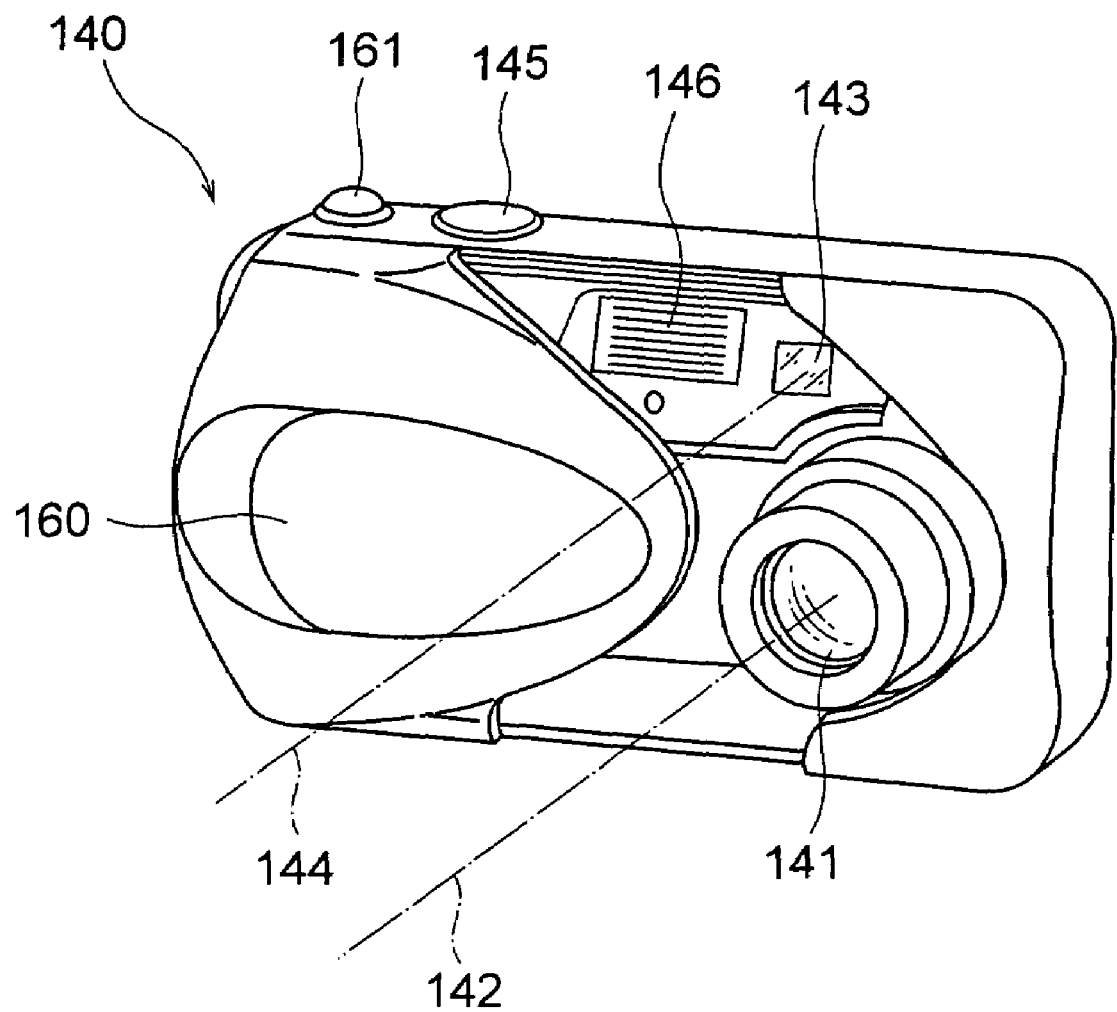
FIG. 6 is a front perspective view showing an appearance of a digital camera in which, a zoom lens system according to the present invention is incorporated.
Figure 7:
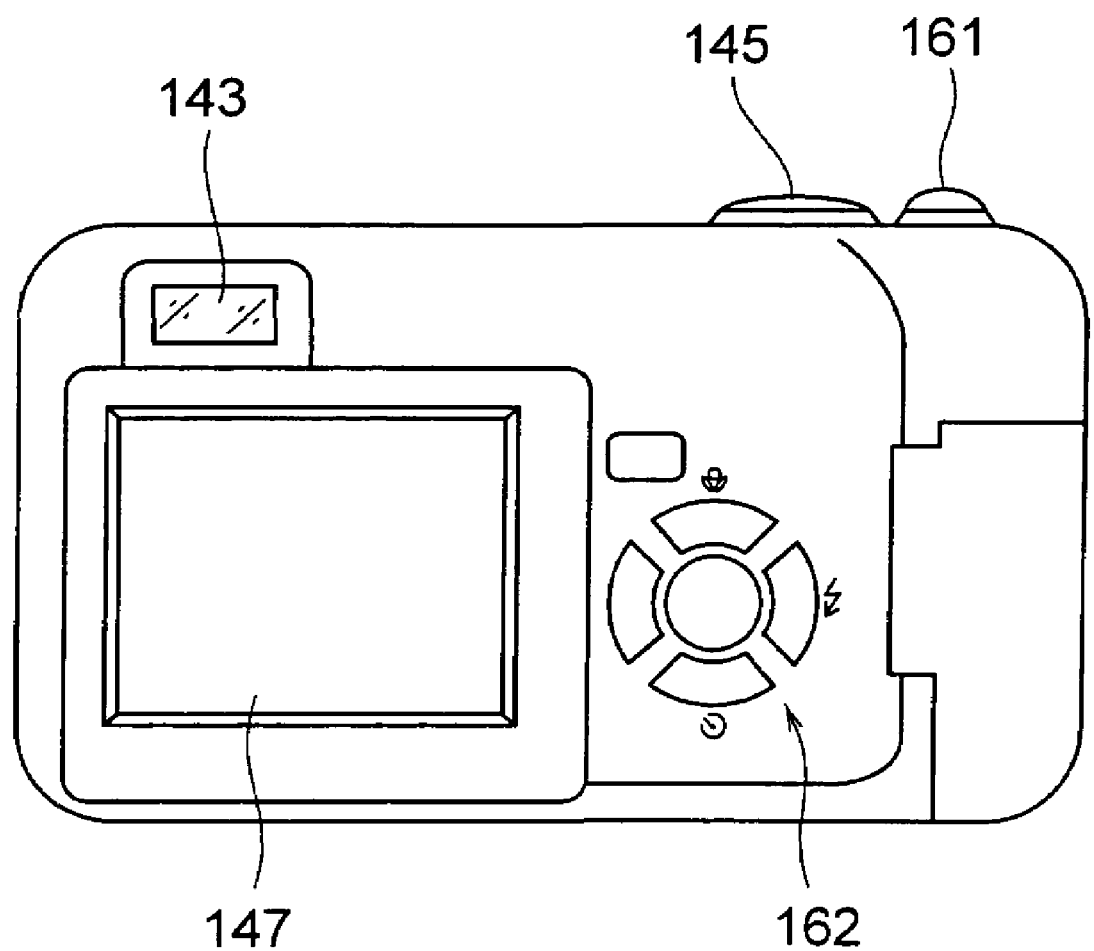
FIG. 7 is a rear perspective view of the digital camera in FIG. 6.
Figure 8:
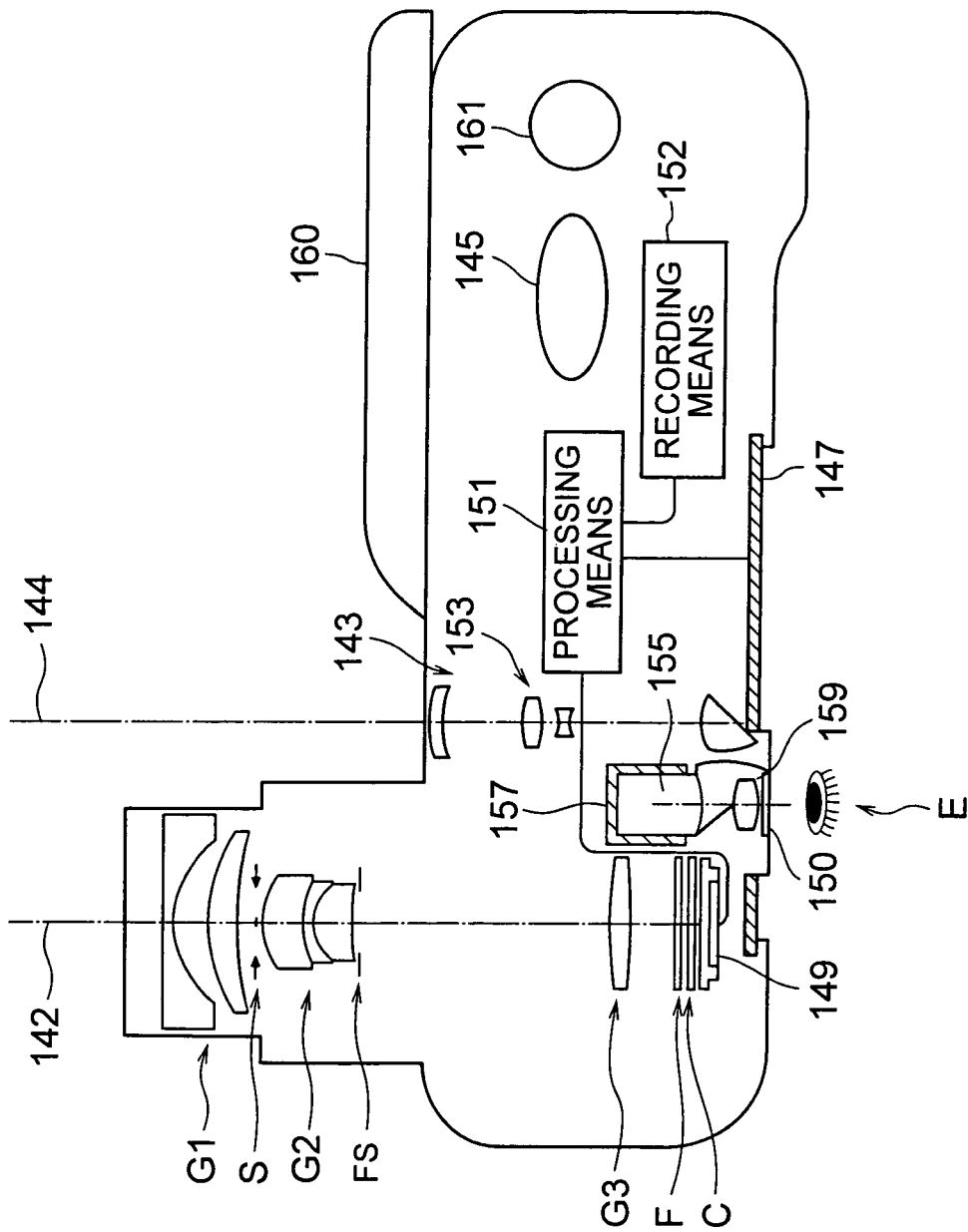
FIG. 8 is a cross-sectional view of the digital camera in FIG. 6.

FIG. 6 to FIG. 8 are conceptual diagrams of a structure of a digital camera according to the present invention in which a zoom lens system described above is incorporated in a taking optical system 141. FIG. 6 is a front perspective view showing an appearance of a digital camera 140, FIG. 7 is a rear perspective view of the same, and FIG. 8 is a schematic cross-sectional view showing a structure of the digital camera 140. In FIG. 6 and FIG. 8, show an uncollapsed state (lens is not drawn out) of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 6, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 9:
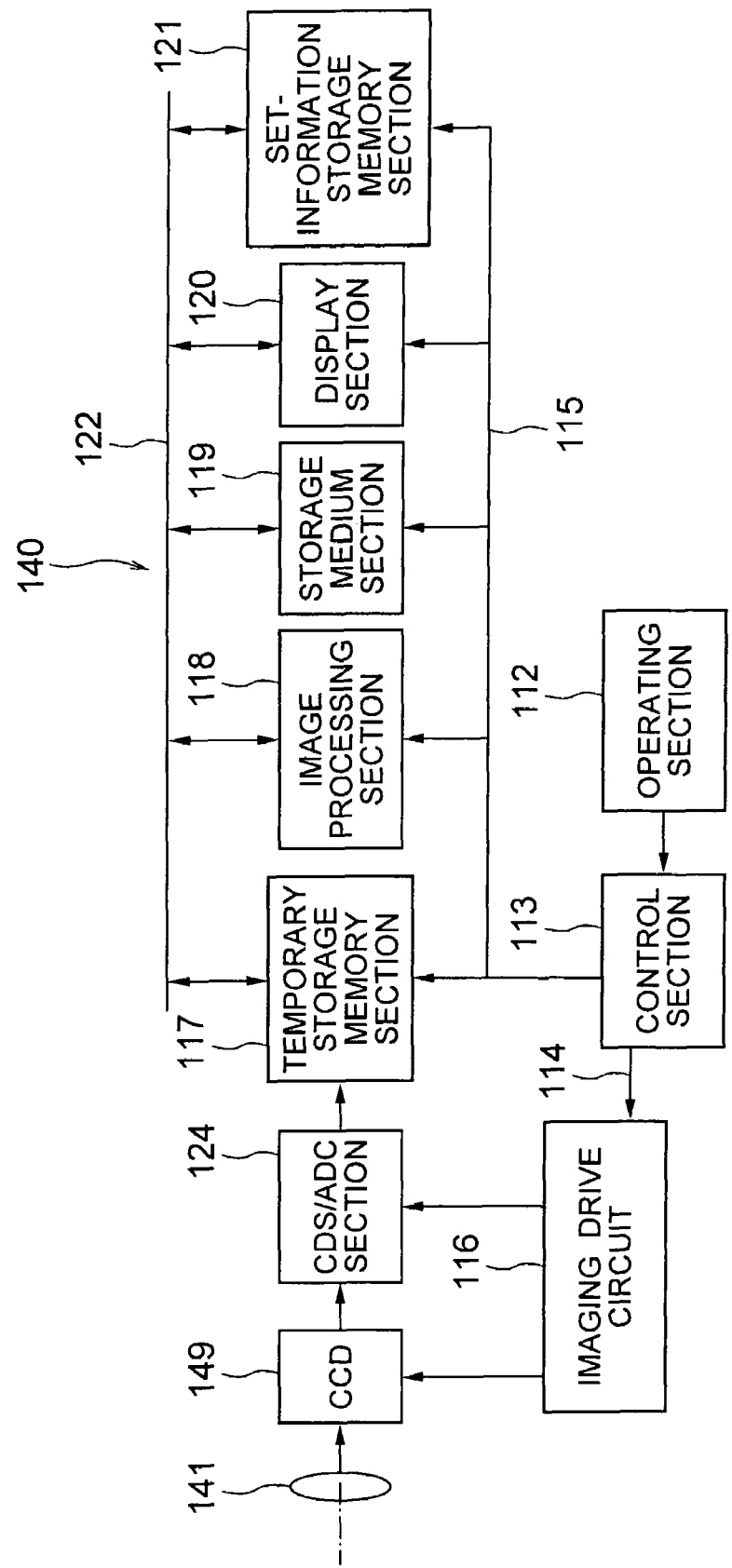
FIG. 9 is a structural block diagram of an internal circuit of main components of a digital camera.

FIG. 9 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 9, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the three-unit zoom lens system according to the present invention is useful in securing an optical performance and size reduction while having a high zooming ratio.

What is claimed is:

1. A three-unit zoom lens system comprising in order from an object side thereof:

a first lens unit having a negative refracting power;
a second lens unit having a positive refracting power; and
a third lens unit having a refracting power, wherein
at the time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end,
the third lens unit moves to a position of increasing magnification at the telephoto end with respect to a position at the wide angle end, and
the first lens unit comprises a biconcave negative lens component nearest to the object, and
the biconcave negative lens component is the only negative lens component in the first lens unit, and
the second lens unit comprises a cemented lens component which includes three lenses in order from the object side namely, a first positive lens, a negative lens, and a second positive lens, and these three lenses are cemented mutually on an optical axis, and
the total number of lens components in the second lens unit is one, and
a surface on the image side of the negative lens in the second lens unit is a concave surface, and the negative lens in the second lens unit has an Abbe's number smaller than the Abbe's number of the first positive lens and the second positive lens, and has a refractive index higher than a refractive index of the second positive lens, and the third lens unit comprises a lens component, and the total number of lens components in the third lens unit is one, and the three-unit zoom lens system satisfies the following conditional expressions $$f_t/f_w > 3.6 \quad (1)$$

$$0 < (r_{L11f} + r_{L11r})/(r_{L11f} - r_{L11r}) < 1.0 \quad (2)$$

where, $F_w$ denotes a focal length of the three-unit zoom lens system, at the wide angle end, $f_t$ denotes a focal length of the three-unit zoom lens system at the telephoto end, $r_{L11f}$ denotes a paraxial radius of curvature of a surface on the object side, of the biconcave negative lens element in the first lens unit, and $r_{L11r}$ denotes a paraxial radius of curvature of a surface on the image side, of the biconcave negative lens in the first lens unit, and the lens component is a lens having only two surfaces which make a contact with air on the optical axis, namely a surface on the object side and a surface on the image side, and means a single lens or a cemented lens.

2. The three-unit zoom lens system according to claim 1, wherein the second lens unit satisfies the following conditional expression $$2.1 < D_{L23}/D_{L22} < 7.0 \quad (3)$$

where, $D_{L23}$ denotes an optical axial thickness of the second positive lens in the second lens unit, and $D_{L22}$ denotes an optical axial thickness of the negative lens in the second lens unit.

3. The three-unit zoom lens system according to claim 1, wherein at the time of zooming from the wide angle end to the telephoto end, the first lens unit, first moves toward the image side, and thereafter moves toward the object side, and the lens component in the third lens unit is a positive lens component, and at the time of zooming from the wide angle end to the telephoto end, the third lens first moves toward the object side, and thereafter moves toward the image side.

4. The three-unit zoom lens system according to claim 1, wherein the lens component in the third lens unit is a positive lens component, and is positioned at the image side at the telephoto end with respect to the wide angle end, and focusing from a long-distance object to a short-distance object is carried out by moving the third lens unit toward the object side.

5. The three-unit zoom lens system according to claim 1, wherein the lens component in the third lens unit is a negative lens component, and is positioned at the object side at the telephoto end with respect to the wide angle end, and focusing from a long-distance object to a short-distance object is carried out by moving the third lens unit toward the image side.

6. The three-unit zoom lens system according to claim 4, wherein the three-unit zoom lens system satisfies the following conditional expression $$0.15 < 1 - \beta_{3T}^2 < 0.7 \quad (4)$$

where, $\beta_{3T}$ denotes a lateral magnification of the third lens unit at the time of focusing at an object at the longest distance, at the telephoto end.

7. The three-unit zoom lens system according to claim 1, wherein the first lens unit comprises in order from the object side thereof, a negative lens and a positive lens, and the total number of lenses in the first lens unit is two.

8. The three-unit zoom lens system according to claim 1, wherein the first lens unit comprises in order from the object side thereof, a biconcave negative lens component, and a positive meniscus lens component having a convex surface directed toward the object side, and the total number of lens components in the first lens unit is two, and each lens component is a single lens, and the total number of lenses in the second lens unit is three, and the total number of lenses in the third lens unit is one, and the three-unit zoom lens system satisfies the following conditional expression $$1.3 < C_{jmax}/f_t < 3.0 \quad (5)$$

where, $C_{jmax}$ denotes a maximum value of an overall length of the three-unit zoom lens system in a zoom range from the wide angle end to the telephoto end, and the overall length is a length obtained by adding a back focus expressed in an air conversion length, to an optical axial thickness from a surface of incidence of a lens nearest to the object up to a surface of emergence nearest to the image, of the three-unit zoom lens system.

9. The three-unit zoom lens system according to claim 1, wherein the three-unit zoom lens system satisfies the following conditional expression $$4.0 < C_j(w)/f_w < 10.0 \quad (6)$$

where, $C_j(w)$ denotes an overall length of the three-unit zoom lens system at the wide angle end, and the overall length is a length obtained by adding a back focus expressed in an air conversion length, to an optical axial thickness from a surface of incidence of a lens nearest to the object up to a surface of emergence nearest to the image, of the three-unit zoom lens system.

10. The three-unit zoom lens system according to claim 1, wherein the three-unit zoom lens system satisfies the following conditional expression $$1.3 < Cj(t)/f_t < 2.5 \quad (7)$$

where, $Cj(t)$ denotes an overall length of the three-unit zoom lens system at the telephoto end, and the overall length is a length obtained by adding a back focus expressed in an air conversion length, to an optical axial thickness from a surface of incidence of a lens nearest to the object side up to a surface of emergence nearest to the image, of the three-unit zoom lens system.

11. The three-unit zoom lens system according to claim 1, wherein the three-unit zoom lens system satisfies the following conditional expression $$-1.4 < f_{L11}/f_w < -0.3 \tag{8}$$

where, $f_{L11}$ denotes a focal length of the biconcave negative lens component in the first lens unit.

12. The three-unit zoom lens system according to claim 1, wherein the three-unit zoom lens system satisfies the following conditional expression $$2.0 < f_{G2}/IH_w < 4.0 \tag{9}$$

where, $f_{G2}$ denotes a focal length of the second lens unit, and
$IH_w$ denotes an image height at the wide angle end.

13. The three-unit zoom lens system according to claim 1, wherein the three-unit zoom lens system satisfies the following conditional expression $$0.1 < D_{1G}/f_w < 1.5 \tag{10}$$

where, $D_{1G}$ denotes an optical axial thickness of the first lens unit.

14. The three-unit zoom lens system according to claim 1, wherein both, a lens surface nearest to the object and a lens surface nearest to the image in the second lens unit, are aspheric surfaces.

15. An image pickup apparatus comprising:

a three-unit zoom lens system; and an image pickup element which is disposed at an image side of the three-unit zoom lens system, and which changes an optical image formed by the three-unit zoom lens system, to an electric signal, wherein the three-unit zoom lens system is a zoom lens system according to claim 1.

16. The image pickup apparatus according to claim 15, further comprising:

an image conversion section which converts an electric signal including a distortion due to the three-unit zoom lens system, to an image signal in which, the distortion is corrected by an image processing.

* * * * *